(12) United States Patent
Nugteren et al.

(10) Patent No.: US 10,733,012 B2
(45) Date of Patent: Aug. 4, 2020

(54) CONFIGURING THREAD SCHEDULING ON A MULTI-THREADED DATA PROCESSING APPARATUS

(71) Applicant: ARM LIMITED, Cambridge (GB)

(72) Inventors: Cedric Nugteren, Cambridge (GB); Anton Lokhmotov, Cambridge (GB)

(73) Assignee: ARM Limited, Cambridge (GB)

( * ) Notice: Subject to any disclaimer, the term of this patent is extended or adjusted under 35 U.S.C. 154(b) by 38 days.

(21) Appl. No.: 14/557,881

(22) Filed: Dec. 2, 2014

(65) Prior Publication Data

US 2015/0160970 A1 Jun. 11, 2015

(30) Foreign Application Priority Data

Dec. 10, 2013 (GB) .................................. 1321841.7

(51) Int. Cl.
*G06F 9/48* (2006.01)
*G06F 8/41* (2018.01)

(52) U.S. Cl.
CPC ............ *G06F 9/4881* (2013.01); *G06F 8/451* (2013.01); *G06F 2209/483* (2013.01); *G06F 2209/484* (2013.01); *G06F 2209/485* (2013.01)

(58) Field of Classification Search
CPC ... G06F 9/445–4451; G06F 9/48–4887; G06F 11/34–3696; G06F 8/451; G06F 2209/483–485
See application file for complete search history.

(56) References Cited

U.S. PATENT DOCUMENTS

| | | | |
|---|---|---|---|
| 4,318,173 A | 3/1982 | Freedman | |
| 4,333,144 A | 6/1982 | Whiteside | |
| 5,724,586 A | 3/1998 | Edler | |
| 6,226,787 B1 * | 5/2001 | Serra | G06F 11/3664 714/E11.217 |
| 6,341,338 B1 | 1/2002 | Dennie | |
| 6,473,780 B1 * | 10/2002 | Barcelo | G06F 13/30 710/22 |

(Continued)

FOREIGN PATENT DOCUMENTS

CN 101833438 A 9/2010

OTHER PUBLICATIONS

Nugteren et al., "High Performance Predictable Histogramming on GPUs: Exploring and Evaluating Algorithm Trade-offs", published by ACM, GPGPU-4 Mar. 5, 2011, Newport Beach, CA, USA, pp. 1-8 (Year: 2011).*

(Continued)

*Primary Examiner* — S. Sough
*Assistant Examiner* — Zheng Wei
(74) *Attorney, Agent, or Firm* — Nixon & Vanderhye, P.C.

(57) ABSTRACT

An apparatus for performing data processing in a single program multiple data fashion on a target data set is provided, having execution circuitry configured to execute multiple threads, thread schedule configuration storage configured to store information defining a plurality of thread schedule configurations, and thread scheduling circuitry configured to cause the execution circuitry to execute the multiple threads in a selected order defined by a selected thread schedule configuration. A method of operating the apparatus, as well as a method of compiling a source program for the apparatus are also provided.

19 Claims, 16 Drawing Sheets

(56) References Cited

U.S. PATENT DOCUMENTS

| | | | |
|---|---|---|---|
| 6,542,921 B1* | 4/2003 | Sager | G06F 9/4881 712/228 |
| 6,578,065 B1* | 6/2003 | Aglietti | G06F 9/4881 711/133 |
| 6,725,455 B2 | 4/2004 | Staiger | |
| 6,832,367 B1* | 12/2004 | Choi | G06F 11/3664 714/E11.207 |
| 6,854,108 B1* | 2/2005 | Choi | G06F 11/3664 714/38.1 |
| 7,296,270 B2 | 11/2007 | Wetzel | |
| 7,310,722 B2* | 12/2007 | Moy | G06F 9/3851 712/207 |
| 7,337,443 B2 | 2/2008 | Welland | |
| 7,366,878 B1* | 4/2008 | Mills | G06F 9/3838 712/214 |
| 7,401,335 B2 | 7/2008 | Pizzi | |
| 7,441,101 B1 | 10/2008 | Steiss | |
| 7,659,898 B2 | 2/2010 | Prokopenko | |
| 7,659,899 B2 | 2/2010 | Paltashev | |
| 7,853,950 B2* | 12/2010 | Lewis | G06F 9/4881 718/100 |
| 7,941,645 B1 | 5/2011 | Riach | |
| 8,087,029 B1* | 12/2011 | Lindholm | G06F 9/5083 714/1 |
| 8,166,237 B1 | 4/2012 | Atsatt | |
| 8,373,716 B2 | 2/2013 | Bronstein et al. | |
| 8,468,532 B2* | 6/2013 | Aguilar, Jr. | G06F 9/4881 718/103 |
| 8,566,647 B2 | 10/2013 | Maybee | |
| 8,683,472 B2* | 3/2014 | Augenstein | G06F 9/4881 718/103 |
| 9,129,050 B2* | 9/2015 | Lippett | G06F 11/3636 |
| 9,170,843 B2 | 10/2015 | Glew | |
| 9,189,242 B2* | 11/2015 | Lindholm | G06F 9/3851 |
| 9,274,832 B2* | 3/2016 | Chang | G06F 9/4881 |
| 9,286,262 B2 | 3/2016 | Lippett | |
| 9,507,637 B1 | 11/2016 | Saville | |
| 2002/0099757 A1 | 7/2002 | Wetzel | |
| 2003/0177162 A1 | 9/2003 | Staiger | |
| 2004/0015684 A1 | 1/2004 | Peterson | |
| 2004/0019746 A1* | 1/2004 | Sager | G06F 9/383 711/137 |
| 2004/0177165 A1 | 9/2004 | Masputra | |
| 2005/0149936 A1 | 7/2005 | Pilkington | |
| 2005/0237329 A1* | 10/2005 | Rubinstein | G06F 12/0207 345/531 |
| 2005/0240923 A1* | 10/2005 | Duke | G06F 9/4881 718/100 |
| 2006/0059485 A1 | 3/2006 | Onufryk | |
| 2006/0123420 A1 | 6/2006 | Nishikawa | |
| 2006/0161924 A1 | 7/2006 | Di Gregorio | |
| 2007/0030278 A1 | 2/2007 | Prokopenko | |
| 2007/0030279 A1 | 2/2007 | Paltashev | |
| 2007/0030280 A1 | 2/2007 | Paltashev | |
| 2007/0113053 A1* | 5/2007 | Jensen | G06F 9/3836 712/214 |
| 2007/0124733 A1 | 5/2007 | Bril | |
| 2007/0159488 A1 | 7/2007 | Danskin et al. | |
| 2007/0169125 A1 | 7/2007 | Qin | |
| 2007/0226739 A1 | 9/2007 | Dodge | |
| 2007/0266387 A1 | 11/2007 | Henmi | |
| 2007/0300231 A1* | 12/2007 | Aguilar | G06F 9/4881 718/104 |
| 2008/0163240 A1* | 7/2008 | Aguilar | G06F 9/4881 718/107 |
| 2009/0138683 A1 | 5/2009 | Capps, Jr. | |
| 2009/0144745 A1* | 6/2009 | Gunnels | G06F 11/3404 718/105 |
| 2009/0307698 A1* | 12/2009 | Khatri | G06F 1/3203 718/102 |
| 2010/0082944 A1 | 4/2010 | Adachi et al. | |
| 2010/0082945 A1 | 4/2010 | Adachi | |
| 2010/0100708 A1 | 4/2010 | Ukai | |
| 2011/0050713 A1* | 3/2011 | McCrary | G06F 9/3851 345/522 |
| 2011/0055479 A1* | 3/2011 | West | G06F 9/4881 711/118 |
| 2011/0072244 A1 | 3/2011 | Lindholm et al. | |
| 2011/0072438 A1 | 3/2011 | Fiyak | |
| 2011/0078226 A1 | 3/2011 | Baskaran et al. | |
| 2011/0231854 A1* | 9/2011 | Augenstein | G06F 9/4881 718/103 |
| 2011/0246995 A1* | 10/2011 | Fedorova | G06F 9/5033 718/103 |
| 2012/0023505 A1 | 1/2012 | Shin | |
| 2012/0089812 A1 | 4/2012 | Smith | |
| 2012/0159261 A1 | 6/2012 | Maybee | |
| 2012/0179935 A1* | 7/2012 | Wang | G06F 11/3676 714/32 |
| 2013/0024867 A1 | 1/2013 | Glew | |
| 2013/0160023 A1 | 6/2013 | Suzuki | |
| 2013/0254592 A1 | 9/2013 | Yamada | |
| 2013/0283101 A1* | 10/2013 | Yang | G06F 11/3612 714/37 |
| 2013/0290971 A1* | 10/2013 | Chen | G06F 9/4881 718/102 |
| 2013/0326282 A1* | 12/2013 | Lippett | G06F 11/3636 714/45 |
| 2014/0025857 A1 | 1/2014 | Lippett | |
| 2014/0026141 A1* | 1/2014 | Lippett | G06F 9/4812 718/104 |
| 2014/0089642 A1* | 3/2014 | Gottschlich | G06F 11/3664 712/220 |
| 2014/0109098 A1 | 4/2014 | Sato | |
| 2014/0189698 A1* | 7/2014 | Choquette | G06F 9/4881 718/103 |
| 2014/0237474 A1 | 8/2014 | Branton | |
| 2015/0089249 A1* | 3/2015 | Hannon | G06F 9/5094 713/300 |

OTHER PUBLICATIONS

U.S. Appl. No. 14/557,935, filed Dec. 2, 2014, Glauert.

GB Search Report for GB Application No. 1321831.8, dated May 28, 2014, Mr. Nigel Hanley, 3 pages.

Edelman, Alan et al., "Index Transformation Algorithms in a Linear Albegra Framework", IEEE Transactions on Parallel and Distributed Systems, vol. 5, No. 12, (Dec. 1994), pp. 1302-1309.

Jog, Adwait et al., "Orchestrated Scheduling and Prefetching for GPGPUs", ISCA '13, (May 6, 2013), 12 pages.

Mackerras, P. et al., "Index Bit Permutations for Automatic Data Redistribution", IEEE, (1997), pp. 23-30.

Shao, J. et al., "The Bit-reversal SDRAM Address Mapping", Scopes '05, (Sep. 29-Oct. 1, 2005), pp. 62-71.

Sung, I-J et al., "Data Layout Transformation Exploiting Memory-Level Parallelism in Structured Grid Many-Core Applications", PACT' 10, (Sep. 11-15, 2010), pp. 513-522.

International Search Report for PCT/GB2014/053418 dated Jan. 28, 2015, six (6) pages.

Written Opinion of the ISA for PCT/GB2014/053418 dated Jan. 28, 2015, seven (7) pages.

Henry Wong et al., "Demystifying GPU Microarchitecture through Microbenchmarking", *Performance Analysis of Systems & Software (ISPASS)*, Mar. 28, 2010, pp. 235-246.

Search Report for GB 1321841.7 dated May 30, 2014, three pages.

Bakhoda et al., "Analyzing CUDA Workloads Using a Detailed GPU Simulator", *University of British Columbia*, No Date, 12 pages.

Ding et al., "Predicting Whole-Program Loyalty through Reuse Distance Analysis", *PLDI '03*, Jun. 9-11, 2003, pp. 245-257.

Fuller et al., "Computer Performance: Game Over or Next Level?" *IEEE*, Jan. 2011, pp. 31-38.

Gebhart et al., "A Hierarchical Thread Scheduler and Register File for Energy-Efficient Throughput Processors", *ACM Transactions on Computer Systems*, vol. 30, No. 2, Article 8, Apr. 2012, 38 pgs.

Jog et al., "OWL: Cooperative Thread Array Aware Scheduling Techniques for Improving GPGPU Performance", *ASPLOS'13*, Mar. 16-20, 2013, pp. 1-12.

(56) References Cited

OTHER PUBLICATIONS

Kayiran et al., "Neither More Nor Less: Optimizing Thread-level Parallelism for GPGPUs", *Technical Report CSE-12-006*, Sep. 2012, 13 pages.

I. Kontaxakis, "Contribution to Image Segmentation and Integral Image Coding", *National and Kapodistrian Univ. of Athens*, No Date, 10 pages.

Lashgar et al., "Dynamic Warp Resizing: Analysis and Benefits in High-Performance SIMT", No Date, 2 pages.

Meng et al., "Dynamic Warp Subdivision for Integrated Branch and Memory Divergence Tolerance", *ISCA '10*, Jun. 19-23, 2010, 12 pages.

Narasiman et al., "Improving GPU Performance via Large Warps and Two-Level Warp Scheduling", *MICRO'11*, Dec. 3-7, 2011, 10 pages.

Philbin et al., "Thread Scheduling for Cache Locality", *ASPLOS VII*, Oct. 1996, pp. 60-71.

Rogers et al., "Cache-Conscious Wavefront Scheduling", *Univ. of British Columbia / Advanced Micro Devices, Inc.*, No Date, 12 pages.

Stratton et al., "Optimization and Architecture Effects on GPU Computing Workload Performance", *University of Illinois*, No Date, 10 pages.

Tam et al., "Thread Clustering: Sharing-Aware Scheduling on SMP-CMP-SMT Multiprocessors", *Eurosys'07*, Mar. 21-23, 2007, pp. 47-58.

Thekath et al., "Impact of Sharing-Based Thread Placement on Multithreaded Architectures", *University of Washington, Dept. of Computer Science and Eng., FR-35*, No Date, pp. 1-15.

Office Action dated Mar. 25, 2016 in co-pending U.S. Appl. No. 14/557,935, 25 pages.

Notice of Allowance received in co-pending U.S. Appl. No. 14/557,935 dated Mar. 10, 2017.

Office Action in co-pending U.S. Appl. No. 14/557,935 dated Oct. 6, 2016.

Office Action in related Chinese Application No. 201410725587.2 dated Mar. 13, 2018 (English translation).

* cited by examiner

EXAMPLE CODE A:

```
TID = Ø ;
y = (0..3) {
    x = (0..3) {
        TARGET [TID] = (x,y) ;
        TID++ ; }
    NEXT x ;
NEXT y ;
```

(ROW MAJOR ORDERING)

VARIANT B:

──────── THESE LINES
──────── SWITCHED

OR

SUBSTITUTE = (y, x)

(COLUMN MAJOR ORDERING)

40

42

CACHE ACCESSES

SELECTED THREAD SCHEDULE ORDER

MAX MEMORY SPACE DISTANCE

CACHE ACCESSES

SELECTED THREAD SCHEDULE ORDER

MAX MEMORY SPACE DISTANCE

STRIDE VALUES
OF $2^N$ ANALYSED       THREAD SCHEDULES

N=0              0, 1, 2, 3, 4......  ⎫
N=1              0, 2, 4, 6, 8......  ⎬ NB "MODULO 15"
N=2              0, 4, 8, 12, 1......  ⎬
N=3              0, 8, 1, 9, 2......  ⎭

| THREAD | MEMORY ACCESSES | | |
|---|---|---|---|
| $t_0$ | 7 | 9 | 2 |
| $t_1$ | 7 | 7 | 2 |
| $t_2$ | 7 | 9 | 2 |
| $t_3$ | 2 | 7 | 9 |
| $t_4$ | 7 | 7 | 2 |

SIMILARITY METRIC

| THREAD | MEMORY ACCESSES | | |
|---|---|---|---|
| $t_0$ | 7 | 19 | 2 |
| $t_1$ | 8 | 20 | 5 |
| $t_2$ | 6 | 21 | 3 |
| $t_3$ | 5 | 23 | 1 |

SIMILARITY METRIC ALLOWING $\delta \leq 2$

CONFIGURING THREAD SCHEDULING ON A MULTI-THREADED DATA PROCESSING APPARATUS

This application claims priority to GB Patent Application No. 1321841.7 filed Dec. 10, 2013, the entire content of which is hereby incorporated by reference.

FIELD

The present invention relates to data processing. More particularly, the present invention relates to the scheduling of multiple threads executed on a multi-threaded data processing apparatus.

BACKGROUND

Data processing apparatuses which are programmed in a single program multiple data (SPMD) fashion to then execute multiple threads to perform the required data processing, in particular graphics processing units (GPUs), have grown in capability and indeed have emerged as a popular platform for non-graphics computations. Through programming models such as OpenCL, Renderscript and CUDA, programmers can use these massively parallel architectures for computational domains such as linear algebra, image processing and molecular science. The increased popularity of such devices has made programmability, maintainability and portability issues of major importance.

SPMD programming models such as those mentioned above are advantageously flexible in that they allow the programmer to specify the independence of threads, removing ordering constraints. However, this very flexibility also places a burden on the programmer, because of the effect that the particular manner in which the threads are programmed can have on the architecture performance. As such, programmers are still required to manually perform data-locality optimizations such as memory coalescing or loop tiling, and to take into account GPU architectural characteristics such as the core count and the on-chip memory hierarchy. Furthermore, the programmer's freedom to determine the allocation of the threads to workgroups (in OpenCL)/blocks (in CUDA) may be desirable from a pure programming point of view but can negatively affect the GPU's scheduling freedom and cache performance.

There remains the potential to improve the performance of a multi-threaded data processing apparatus (such as a GPU).

SUMMARY

Viewed from a first aspect, the present invention provides an apparatus for performing data processing in a single program multiple data fashion on a target data set, the apparatus comprising:

execution circuitry configured to execute multiple threads to perform the data processing;

thread schedule configuration storage configured to store information defining a plurality of thread schedule configurations, each thread schedule configuration defining an order in which the multiple threads are to be executed by the execution circuitry; and thread scheduling circuitry configured to cause the execution circuitry to execute the multiple threads in a selected order defined by a selected thread schedule configuration of the plurality of thread schedule configurations in response to a thread schedule selection signal.

Viewed from a second aspect the present invention provides a method of performing data processing in a single program multiple data fashion on a target data set, the method comprising the steps of:

executing multiple threads to perform the data processing;

storing information defining a plurality of thread schedule configurations, each thread schedule configuration defining an order in which the multiple threads are to be executed in the executing step; and controlling the execution of the multiple threads to be in a selected order defined by a selected thread schedule configuration of the plurality of thread schedule configurations in response to a thread schedule selection signal.

Viewed from a third aspect the present invention provides an apparatus for performing data processing in a single program multiple data fashion on a target data set comprising:

means for executing multiple threads to perform the data processing;

means for storing information defining a plurality of thread schedule configurations, each thread schedule configuration defining an order in which the multiple threads are to be executed by the means for executing multiple threads; and means for controlling the execution of the multiple threads to be in a selected order defined by a selected thread schedule configuration of the plurality of thread schedule configurations in response to a thread schedule selection signal.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
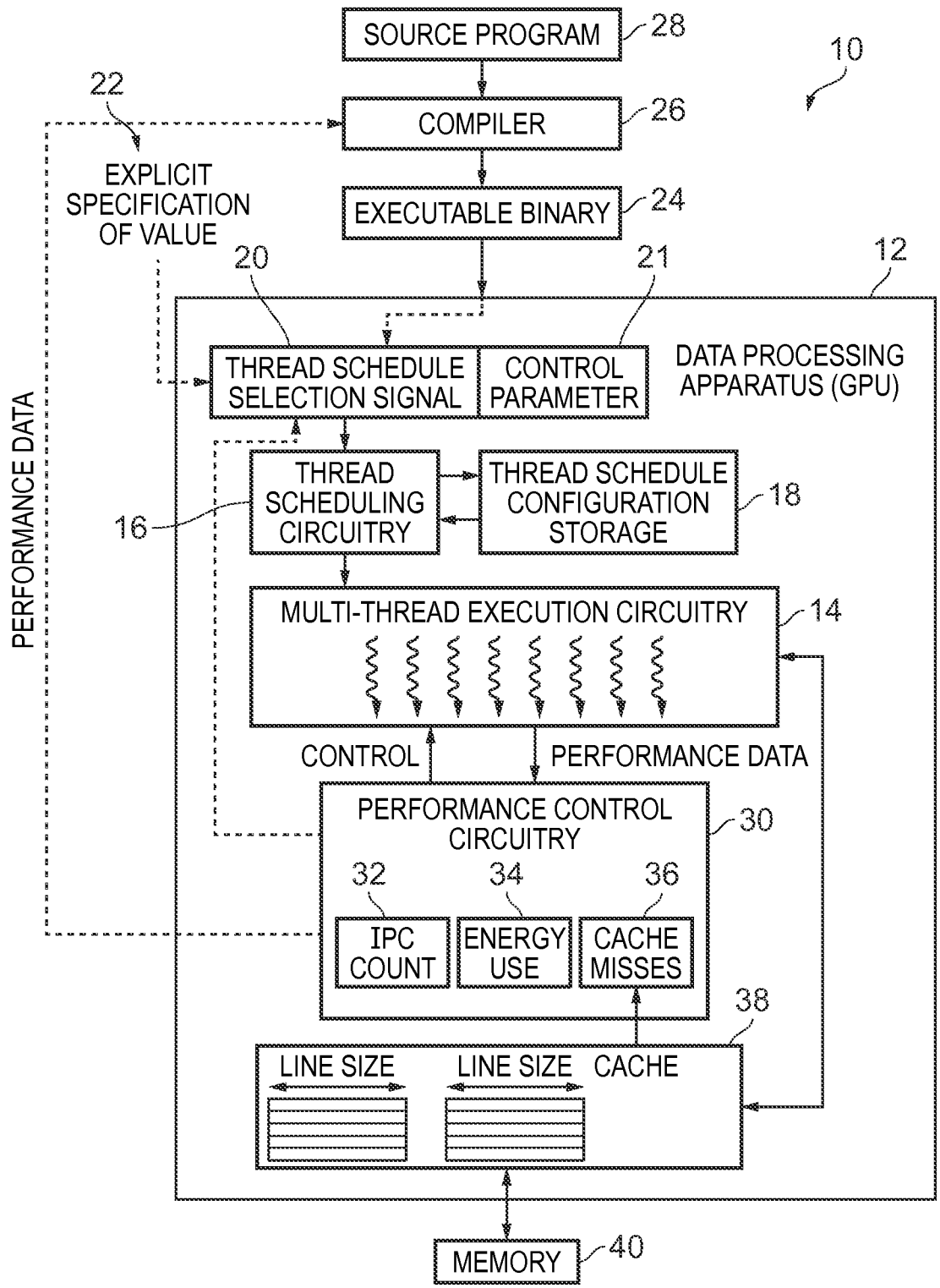
FIG. 1 schematically illustrates a data processing system in which a compiler generates an executable from a source program for execution on an apparatus according to one embodiment.

The inventors of the present invention have found that the performance of a multi-threaded data processing apparatus which is programmed in a single program multiple data (SPMD) fashion to execute multiple threads concurrently to perform the data processing, for example measured in the terms of instructions-per-cycle (IPC), can vary widely in dependence on the thread scheduling policy with which the apparatus is configured to operate. This data processing may for example be a graphics processing task, but is not limited thereto and could (as mentioned above for the diverse applications that GPUs now find) be a non-graphics task, such as related to linear algebra or molecular science. Staying with an example of graphics processing, when considering five different styles of thread scheduling, namely simple sequential, "stride" (having a configurable stride length and granularity), "zigzag" (in a 2D grid of threads, reversing the ordering of odd rows), "tiled" (2D sub-tiling within a 2D grid of threads), and a "Hilbert curve" (a space filling fractal for traversing a 2D grid) and testing a number of configuration of each of these styles using six different benchmark processing tasks, namely an integral image (row-wise) calculation, an integral image (column-wise) calculation, an 11 by 11 convolution, a matrix multiplication, a matrix copy (per row) and a matrix copy (per column), the inventors investigations have shown that wide performance variation results. The present invention addresses this issue by providing the apparatus with a thread schedule configuration storage which is configured to store information defining a plurality of thread schedule configurations which define an order in which the multiple threads are to be executed by the execution circuitry. Information defining a great number of different thread schedule configurations can be stored in the thread schedule configuration storage thus allowing the apparatus advantageously to be reconfigured in the manner in which it schedules its threads for execution. This reconfiguration may for example be in dependence on the particular kind of data processing which the apparatus is required to perform, the nature of the target data set on which that data processing is performed and/or the particular architectural arrangement of the apparatus. In order to implement one of the stored thread schedule configurations, thread scheduling circuitry is provided which is responsive to a thread schedule selection signal to cause the execution circuitry to execute the multiple threads in accordance with a corresponding selected thread schedule (i.e. to execute the multiple threads in the particular order defined by that selected thread schedule). The thread schedule selection signal itself may come from a number of different sources either internal to the apparatus or external to it, and this further provides an advantageous degree of flexibility in the adaptability of the apparatus to different processing requirements.

In some embodiments, the apparatus may further comprise performance control circuitry configured to gather performance data relating to the data processing performed by the execution circuitry and to generate the thread schedule selection signal in dependence on the performance data. Accordingly, the thread schedule selection signal may be generated within the apparatus itself, in particular by circuitry which monitors the performance of the execution circuitry in carrying out the data processing and then generates the thread schedule selection signal in dependence on that performance observation. The performance control circuitry may for example change the thread schedule selection circuitry to cause the execution circuitry to switch to a new thread schedule configuration which can be expected to change one or more performance metrics represented by the performance data. Typically desirable performance improvements are to increase the instruction throughput (i.e. IPC) or to reduce energy consumption.

In some embodiments the performance control circuitry is configured to control a performance analysis process, the performance analysis process comprising the steps of:

selecting a minority subset of the multiple threads which are to be executed;

controlling the execution circuitry to execute a first subset of the minority subset of the multiple threads in a first selected order defined by a first thread schedule configuration;

changing the thread schedule selection signal to cause the execution circuitry to execute a next subset of the minority subset of the multiple threads in a next selected order defined by a next thread schedule configuration; and repeating the changing step until all threads of the minority subset of threads have been executed by the execution circuitry, wherein the performance control circuitry is configured to set the thread selection signal to cause the execution circuitry to execute a majority remaining subset of the multiple threads which are to be executed to perform the data processing on the target data set in an order defined by a selected thread schedule tested in the performance analysis process.

The performance control circuitry may therefore be configured to participate in an essentially empirical approach to selecting the appropriate thread schedule configuration to define the order in which the execution circuitry schedules the multiple threads. This may be advantageous due to the number of different possible thread schedule configurations and the number of different data processing contexts in which the apparatus may be required to perform data processing, which may in some situations make a more analytical approach difficult to the point of being impractical. Accordingly, the performance analysis process controlled by the performance control circuitry takes an iterative approach in which a number of different thread schedule configurations are tested and the performance data is gathered for each, such that finally, the performance control circuitry can set the thread selection signal such that the execution circuitry thereafter continues to perform its data processing using the thread schedule configuration which (on the basis of the performance data gathered) has been determined to be preferable (as mentioned above this "preference" can take a number of forms depending on the context). Moreover, the performance analysis process is performed on a minority subset of the multiple threads which are to be executed. In other words, the performance control circuitry selects a small test sample group of threads from amongst all the multiple threads which are required to be executed and controls the performance analysis to be carried out on that test sample. Thereafter (i.e. when the performance analysis performance is complete) the selected thread schedule configuration is used by the execution circuitry to order the majority of the multiple threads which are to be executed, i.e. the larger part of all threads to be executed remaining after the performance analysis process has been performed on an initial "test" subset.

In some embodiments the first subset and next subset each correspond to a workgroup of threads, wherein a workgroup of threads is a selected subset of the multiple threads defined by a programmer of the apparatus or set by default. A "workgroup" (in OpenCL terminology) or a "block" (in CUDA terminology) represents a grouped together number of threads (which may be defined by the programmer, although this can also be left to a default setting) which are to be allocated to a processor core together for execution and such a grouping may therefore provide a suitable subset of the threads selected by the performance control circuitry to be the subject of the performance analysis process for testing at each iteration of the performance analysis process.

In some embodiments at least some of the plurality of thread schedule configurations are further configured in dependence on a control parameter and the performance analysis process further comprises gathering performance data relating to the data processing performed by the execution circuitry for a plurality of values of the control parameter. A great range of thread schedule configurations may be envisaged (some examples of which are mentioned above) but not only may there be a range of "styles" of thread schedule configuration (e.g. sequential, stride, tiled etc.) but some of these styles of thread configuration may lend themselves to further configuration (e.g. the stride length or tile size) and in such situations it is advantageous if the performance analysis process further gathers performance data for a range of values of the control parameter. For example, this may take the form of a nested loop within the iterative procedure of the performance analysis procedure of the performance analysis process, wherein an outer loop iterates over different styles of thread schedule configuration, whilst an inner loop iterates over the range of values of the control parameter. Further, it should be appreciated that whilst some thread schedule configurations may be configured in dependence on a single control parameter, other thread schedule configurations may be configured on two or more control parameters (e.g. in a stride style thread schedule configuration one control parameter may determine the stride length, whilst another control parameter may determine the granularity (i.e. how may threads are taken as a group at each stride interval)). This granularity could for example correspond to a warp or thread block granularity.

In iterating over the plurality of values of the control parameter in the performance analysis process the manner in which the particular values of the control parameter that are tested are chosen could take a variety of different forms. For example, whilst the control parameter could be simply incremented, a function may be applied to determine the next iteration of the control parameter value. For example, in some embodiments the plurality of values of the control parameter corresponds to a geometric progression of the control parameter. This can be advantageous because of the greater range of values of the control parameter it enables the performance analysis to test in a limited number of iterations. This may enable the performance analysis process to more rapidly identify (at least roughly, perhaps then to be followed by a more detailed performance analysis process focussed on control parameter values in that region) the appropriate setting for the control parameter value. The geometric progression may take a number of different forms, but in some embodiments the geometric progression is powers of two of the control parameter. Powers of two of the control parameter may be advantageous because of its relatively simple implementation combined with its potential to correspond to a typical data block sizes and patterns in data processing algorithms.

The control parameter may control aspects of various different thread schedule configurations, but in some embodiments the control parameter is a stride value, the stride value determining a number of threads which are skipped to find a next thread in the selected order, the next thread in the selected order being determined subject to a modulo of a total number of the multiple threads. The next thread in the selected order is determined subject to a modulo of the total number of the multiple threads such that the ordering of the threads "wraps around" appropriately within the full set of threads. As mentioned above, this stride value could also be associated with the further granularity control parameter defining the number of threads which are taken together at each stride interval.

In some embodiments the control parameter is at least one tiling dimension value, the tiling dimension value determining a dimension of tiles within an at least two-dimensional coordinate space of the threads, and wherein the selected order causes the execution circuitry to execute the multiple threads on a tile-by-tile basis. Accordingly, the thread schedule configuration may define a thread ordering in which the threads are scheduled on the basis of tiles within a two-dimensional coordinate space of the threads. Higher dimension coordinate spaces are also envisaged. Whilst only one tiling dimensional value may be provided, multiple tiling dimension values are also envisaged, both in terms of, say, the x and y dimensions of the defined tile, but also defining for example the length of a row in the two-dimensional coordinate space, where the sequential numbering system used for the threads is only defined one-dimensionally.

Whilst the data processing which the apparatus performs after the performance analysis process has completed may be relatively uniform in its configuration requirements, it is recognised that these requirements may change over time, for example where the particular application being performed by the data processing changes and accordingly in some embodiments the performance control circuitry is configured to repeat the performance analysis process at predetermined intervals. These predetermined intervals may be selected as appropriate for the particular system requirements, for example the interval may be a time interval, a number of threads completed, a number of image frames processed, and so on.

When selecting the minority subset of the threads on which the performance analysis process is to be carried out, it may be advantageous to avoid a first set of threads which are to be found at the beginning of all the multiple threads (i.e. in a sequential numbering system of the threads, those threads which have a first sequence of thread numbers). For example, in the context of image processing, and where thread numbers are allocated to pixel locations in a traditional raster scan fashion, it may be the case that data processing performed by threads assigned to the corners and/or edges of each image frame may not represent "typical" data processing (for example, where a blur or convolution is performed using a 3×3 set of pixels around the current pixel, then threads on the edge will proceed into special if-statements to handle the fact that there are no pixels above or left of the current pixel. They will thus have a different control flow and most probably also different memory accesses). Accordingly in some embodiments the performance control circuitry is configured to select the minority subset of the threads to start at a predetermined offset from a beginning of all the multiple threads. This enables the performance analysis process to be carried out on a minority subset of the threads which is at least more "typical" of the bulk of the data processing to be performed.

As mentioned above, the performance data gathered by the performance control circuitry may take a number of different forms, but in some embodiments the performance control circuitry is configured to measure a performance versus time taken metric for the data processing as the performance data. For example, this may be parameterised in the form of an instructions per cycle (IPC) count or could for example be a time measurement for a specific performance benchmark to complete.

Alternatively, or in addition, in some embodiments the performance control circuitry is configured to measure an energy use metric for the data processing as the performance data. This could for example be the (estimated) energy consumed by the apparatus when performing a predetermined data processing task. The energy consumption could for example be estimated by counting high-energy operations such as floating point add/multiply, instructions fetches and data moves between L1 and L2 caches and memory. By assigning a nominal energy cost at each operation it is possible to estimate the total energy used. In addition, the static energy used could be determined by measuring the number of active cycles for each monitored unit and having a nominal energy cost per cycle (equals power) for each unit. Alternatively, explicit circuitry to measure the energy used directly may be provided.

Alternatively, or in addition, in some embodiments the performance control circuitry comprises at least one event counter configured to count occurrences of a predetermined event during the data processing as the performance data. There are a number of predetermined events which could be counted in this way, but in some embodiments the predetermined event is a cache miss in a cache which forms part of the apparatus. It is recognised that improved data processing performance may be strongly correlated with efficient use of a cache structure and monitoring cache misses may therefore be a particularly useful metric.

The cache in which the cache misses are monitored may for example be an L1 cache provided in association with a particular processor core, but in some embodiments the execution circuitry comprises multiple processor cores and the cache is shared by the multiple processor cores (e.g. such as an L2 or last level cache).

In some embodiments the apparatus may be further configured to receive the thread schedule selection signal from an external source. This provides a further advantageous degree of configurability to the apparatus. The external source may take a variety of forms, such as being an explicit input to the apparatus such that the system user can intervene to specify a particular thread schedule configuration which should be used. Alternatively, the thread schedule selection signal may be encapsulated in a program received by the apparatus and in this case the thread schedule selection signal, perhaps in the form of a thread schedule selection value in that program, could on the one hand have been explicitly set by the programmer, but it is also envisaged that this value could be set by a compiler provided to generate an executable for the apparatus on the basis of a source program. It should be noted that the thread schedule selection value might be explicitly set as a value received by the apparatus from the compiler, but could also be defined in terms of a function, for example which will be resolved in the apparatus to determine the specific thread schedule selection value. For example such a function could take, say, a workgroup number or thread number as a variable. A variety of ways in which the compiler may determine such an appropriate thread schedule selection are envisaged, as is described in more detail below.

Accordingly, in some embodiments the apparatus is configured to receive a set of instructions defining the data processing to be performed in the single program multiple data fashion on the target data set, wherein the thread schedule selection signal is generated by the apparatus in dependence on a thread schedule selection value definition associated with the set of instructions.

The apparatus may be a multi-core device, and in some embodiments the execution circuitry comprises multiple processor cores, the thread scheduling circuitry comprises job manager circuitry, and the selected thread schedule configuration further defines the allocation of threads to cores by the job manager circuitry. Accordingly, in such a multi-core environment, it is recognised that not only may the ordering of thread execution within a given processor core affect system performance (for example because of the variation in usage efficiency of an L1 cache associated with that core), but system performance is also dependent on the parallel execution of groups of threads on parallel processor cores (for example in terms of usage efficiency of an L2 cache shared by those multiple cores), and thus configuring the thread schedule configurations to further define the allocation of threads to cores by the job manager circuitry enables an advantageous degree of control to be maintained over which groups of threads are concurrently being executed on the parallel cores.

In some embodiments the thread scheduling circuitry further comprises randomly accessible thread pool storage configured to store an indication of threads which are immediately available for execution by the execution circuitry. Whilst previously a thread scheduler within a processor core has typically retrieved a next thread for scheduling from a thread pool in a first-come-first-served fashion, the flexibility of the present techniques are enhanced by the provision of thread pool storage which is randomly accessible to the thread scheduling circuitry. In other words the thread scheduling circuitry is free to pick any thread of which an indication is currently stored in the thread pool storage, thus enabling a greater range of thread schedule configurations to be implemented.

The present techniques also provide a method of compiling a source program which defines data processing to be performed on an apparatus in a single program multiple data fashion on a target data set, wherein the apparatus comprises:

execution circuitry configured to execute multiple threads to perform the data processing;

thread schedule configuration storage configured to store information defining a plurality of thread schedule configurations, each thread schedule configuration defining an order in which the multiple threads are to be executed by the execution circuitry; and thread scheduling circuitry configured to cause the execution circuitry to execute the multiple threads in a selected order defined by a selected thread schedule configuration of the plurality of thread schedule configurations in response to a thread schedule selection value, the method comprising the steps of:

selecting the selected thread schedule configuration in dependence on analysis information derived from an analysis procedure carried out using the source program as an input; and generating an executable program for the apparatus on the basis of the source program, wherein the executable program is annotated with a definition of the thread schedule selection value corresponding to the selected thread schedule configuration selected in the selecting step.

Accordingly, the present invention envisages that the decision as to which thread schedule configuration should be used by the apparatus may be taken externally to the apparatus, and in particular as part of the process of compiling a source program which defines the data processing to be performed by the apparatus. An analysis procedure is carried out using a source program as an input and on the basis of the results of that analysis procedure the selected thread schedule configuration is determined. Thereafter, an executable program for the apparatus is generated on the basis of the source program and the executable is annotated with a definition of the thread schedule selection value which in turn will cause the appropriate selected thread schedule configuration to be used.

The analysis procedure may take a variety of forms, depending on the particular system, source program and performance constraints. For example, where the source program will result in relatively static behaviour of the apparatus (i.e. the manner in which the apparatus performs the data processing defined by the source program does not significantly (or at all) change for subsequent executions of the same executable program), the analysis procedure may take a more explicitly analytical form wherein predictions about the expected performance behaviour of the apparatus when executing the executable may be made. Alternatively, in situations in which the source program is expected to result in a more dynamic behaviour (i.e. where the performance behaviour varies more widely for subsequent iterations), for example where the source program takes further inputs which will vary from execution iteration to execution iteration, then the analysis procedure may take a more empirical form where the compiler relies on some variety of performance data to inform its decision making process.

In some embodiments, in which a static analysis is possible, the analysis procedure comprises the steps of:

analysing the source program to determine a set of memory accesses which will be performed by a set of threads of the multiple threads;

calculating a value of a similarity metric which quantifies correlations between memory accesses for each pair of threads in the set of threads; and selecting the selected thread schedule configuration such that the selected order causes pairs of threads for which the value of the similarity metric indicates a high correlation to be executed with a close ordering distance to one another in the selected order.

This particular technique recognises that the performance of the apparatus may benefit from pairs of threads which have respective sets of memory accesses which are highly correlated with one another are placed close to one another in the selected order. This is in particular because of the nature of the memory system of the apparatus in which highly correlated memory accesses will tend to result in more efficient usage of that memory structure, for example by memory accesses for each thread being co-stored in a given cache line. Hence, the analysis procedure is configured to first identify the memory accesses which will be performed by a set of threads of the multiple threads and to then calculate, using a similarity metric, how closely related those memory accesses are (in particular in terms of shared or sequentially close memory addresses). A thread schedule configuration is then selected which seeks, amongst the different possible thread schedule configurations, to bring those pairs of threads which are determined to be highly correlated in terms of memory accesses to closer positions to one another in the selected order. This then increases the likelihood that, for example, cache locality benefits such as those described above may result.

Nevertheless the present invention further recognises that a fully deterministic, exhaustive static analysis of the similarity metric for all of the multiple threads to be executed may prove to be prohibitively complex. For example, where the target data set is a 1000×1000 two-dimensional data set and a thread is generated for each of those one million data items the number of correlations which would need to be determined to calculate the value of the a similarity metric covering all pairs of threads (and therefore comprise $10^6!$ permutations) this may be beyond the realms of current practical possibility. Accordingly, in some embodiments the set of threads is a minority subset of the multiple threads. By appropriately sizing the set of threads on which the analysis procedure is carried out an acceptable trade off may be found between the required processing to carry out the analysis procedure and the resulting accuracy of the analysis procedure in terms of correct selection of an appropriate thread schedule configuration.

In some embodiments the minority subset of the multiple threads is selected to start at a predetermined offset from a beginning of all the multiple threads. As explained above, where such a "test" subset of the multiple threads is being used, it may be advantageous to select this test subset such that more typical data processing for the threads is represented and this may involve avoiding selecting this test set such that the target data values processed lie near edges or corners of a two dimensional target data set.

In some embodiments the similarity metric quantifies correlations between plural pairs of memory accesses for each pair of threads. It is advantageous if the similarity metric is able to represent how well correlated a given pair of threads is with respect to several memory accesses which are to be made by those threads. The choice of how many pairs of memory accesses to analyse for each pair of threads is another example of where a suitable trade off can be found between the computational processing required to determine the value of this similarity metric and the resulting accuracy of the prediction for the appropriate thread schedule configuration. In some embodiments the similarity metric is configured in dependence on a distance metric which determines a maximum memory space distance between two memory accesses for which the two memory accesses can be determined by the similarity metric to have a non-zero correlation. Accordingly, whilst it is clearly of benefit for a pair of threads to be placed close to one another in the selected order where those threads make, at least partially, the same memory accesses (i.e. to at least some identical memory locations), it is recognised that a certain memory space distance between two memory accesses may nevertheless be allowable, if the proximity of these two memory accesses can still result in performance benefit.

This memory space distance could take a number of forms. For example, in one such embodiment the maximum memory space distance is given by a cache line size in the data processing apparatus. This is due to the fact that as long as two memory accesses fit within a given cache line, the resulting cache locality benefits may be gained. In one embodiment the maximum memory space distance is given by an ordering distance between two threads to which the two memory accesses belong. This allows for a pair of threads to be placed close (but perhaps not to execute in lock-step with one another) in the selected order and for the performance benefit to still result.

In some embodiments at least some of the plurality of thread schedule configurations are further configured in dependence on a control parameter. Similar embodiments (mutatis mutandis with respect to the performance analysis process carried out by performance control circuitry of the apparatus) have been described above and are not repeated here for brevity. Similarly to the above described embodiments, the geometric progression may take a number of different forms, but in some embodiments the geometric progression is powers of two of the control parameter. Similarly to the above described embodiments, the control parameter may control aspects of various different thread schedule configurations, but in some embodiments the control parameter is a stride value, the stride value determining a number of threads which are skipped to find a next thread in the selected order, the next thread in the selected order being determined subject to a modulo of a total number of the multiple threads. Similarly to the above described embodiments, in some embodiments the control parameter is at least one tiling dimension value, the tiling dimension value determining a dimension of tiles within at least a two-dimensional coordinate space of the target data set, and wherein the selected order causes the execution circuitry to execute the multiple threads on a tile-by-tile basis.

As mentioned above, the analysis procedure carried out as part of the method of compiling the source program may take an at least partially empirical form and in some embodiments the analysis procedure comprises:

test generating a test executable program for the data processing apparatus on the basis of the source program, wherein the test executable program is annotated with a test thread schedule selection value definition corresponding to a test thread schedule configuration;

causing the test executable program to be executed on the apparatus, wherein the apparatus further comprises performance control circuitry configured to gather performance data relating to the data processing performed by the execution circuitry;

receiving the performance data from the apparatus;

repeating the test generating, causing and receiving steps, wherein the test executable program is annotated with a new test thread schedule selection value definition corresponding to a new test thread schedule configuration for each repetition, and in the generating step the thread schedule selection signal is generated in dependence on the performance data.

In such an embodiment, the apparatus and compiler thus cooperate with one another to initially form a test system for the purposes of carrying out the analysis procedure in which the compiler generates a sequence of test executable programs each annotated with a new test thread schedule selection value definition such that the apparatus then (via its performance control circuitry) gathers performance data relating to the data processing performed by the execution circuitry in response to that particular test execution program and this performance data is returned to the compiler for evaluation. After a sequence of such test executable programs have been executed and their respective performance data have been analysed, the compiler can then determine a preferred thread schedule configuration and can then, when generating the final executable program to be executed for the whole of target set, annotate that executable with the appropriate thread schedule selection value definition.

An empirical approach to the analysis procedure may however also be carried out without involving the apparatus itself, for example where the compiler has access (whether internal to the compiler or merely accessible to it) to a simulation of the apparatus. Accordingly, in some embodiments the analysis procedure comprises:

test generating an at least partial test executable program on the basis of the source program, wherein the at least partial test executable program is annotated with a test thread schedule selection value definition corresponding to a test thread schedule configuration;

causing the at least partial test executable program to be executed on an at least partial simulation of the apparatus, wherein the at least partial simulation of the apparatus further comprises a performance control function configured to gather performance data relating to the data processing performed by the at least partial simulation of the apparatus;

receiving the performance data from the at least partial simulation of the apparatus;

repeating the test generating, causing and receiving steps, wherein the test executable program is annotated with a new test thread schedule selection value definition corresponding to a new test thread schedule configuration for each repetition, and in the generating step the thread schedule selection signal is generated in dependence on the performance data.

Accordingly, where the compiler has access to such an at least partial simulation of the apparatus then the compiler can generate a corresponding at least partial test executable program for execution on the at least partial simulation of the apparatus and can receive performance data from a performance control function of that simulation giving performance data relating to the data processing performed by the simulation. As with the above described example of causing a sequence of test executable programs to be executed on the apparatus itself, also here a sequence of test executable programs are caused to be executed on the simulation and each test executable program is annotated with a new test thread schedule selection value definition in order to test the performance of a different thread schedule configuration for each repetition. The compiler can then determine the preferred schedule configuration in dependence on the performance data received and when a final executable is then generated for execution on the apparatus itself this can be annotated with the corresponding thread schedule selection value definition. It should be noted that the simulation of the apparatus need only be at least partial, for example where the focus of the analysis procedure is to determine the preferred thread schedule configuration with respect to the performance of a particular apparatus component.

For example, in some embodiments the at least partial simulation of the apparatus comprises a model of a cache within the apparatus. For example, the compiler may comprise a model of a GPU cache structure, where the apparatus is a GPU, and only those aspects of the execution of the threads relating to the usage of the cache need therefore be simulated. For similar reasons, the test executable program need only be a partial test executable program, in particular providing a suitable executable for testing on the partial simulation of the apparatus.

The present techniques also provide computer readable storage medium storing in a non-transient fashion a computer program configured to cause a computer to carry out the method of the fourth aspect.

FIG. 1 schematically illustrates a data processing system 10, which essentially consists of a data processing apparatus 12, which here is a graphics processing unit (GPU). As such, it will be understood by those of ordinary skill in the art that the data processing system 10 will therefore typically further contain a central processing unit (CPU) which has overall control of the data processing system 10 and in particular determines what data processing tasks are delegated to the GPU 12. Such a CPU is however not illustrated for brevity. The GPU 12 is a multi-threaded data processing apparatus, which is configured to execute its data processing in a single program multiple data (SPMD) fashion and comprises multi-thread execution circuitry 14 for this purpose. Different threads to be executed by the multi-thread execution circuitry 14 are defined by a programmer of the apparatus. Where the target data set of the GPU 12 is an image frame of data values, the programmer may for example define one thread to correspond to each pixel within that image frame. It will be appreciated therefore that a great number of threads can be defined by the programmer, and these may well exceed the number of threads which the multi-thread execution circuitry is configured to be able to handle in parallel. For example, where the target data set is an image frame having a resolution of 1920×1080, a one-to-one relationship between pixels and threads gives 2,073,600 threads. The multi-thread execution circuitry could for example be configured to be able to handle 1024 threads in parallel and therefore will process this target data set in 2025 iterations.

However, whilst the multi-thread circuitry 14 is constrained in the total number of threads which it can execute in parallel (for example 1024 as in the above example) the GPU 12 is configured such that it has a great deal of flexibility in the order in which the threads are scheduled. This is not only in terms of the order in which the threads are scheduled for execution within the constraint of the maximum number of threads which the multi-thread execution circuitry 14 can handle in parallel, but also with respect to the order in which groups of threads (e.g. OpenCL workgroups or CUDA blocks) are scheduled for execution at a higher level or granularity. For this purpose, the GPU 12 is provided with thread scheduling circuitry 16 and thread schedule configurations storage 18. The thread scheduling circuitry 16 determines the order in which threads are to be scheduled for execution by the multi-thread execution circuitry 14 and this is done with reference to the information stored in the thread schedule configuration storage 18. Essentially, the thread schedule configuration storage 18 stores information defining a number of (and advantageously a great number of) different thread schedule configurations which the thread scheduling circuitry 16 can use. Whilst the thread schedule configurations could be stored in a more explicit format in the thread schedule configuration storage 18, it is preferred (in order to limit the amount of storage required) if functional definitions are provided enabling the thread scheduling circuitry 16 to calculate the ordering. The thread scheduling circuitry 16 selects a particular thread schedule configuration from those stored in the thread schedule configuration storage 18 on the basis of a thread schedule selection signal 20 which it receives. In addition, the thread schedule selection signal may be augmented by a control parameter 21, which enables a particular thread schedule configuration to be configured in a particular manner, as will be described in more detail below.

The thread schedule selection signal 20 may be provided by a number of different sources of which several possibilities are illustrated in FIG. 1. In one variant, the thread schedule selection signal may be provided by the explicit specification of this value 22 being provided from an external source to the GPU 12. This gives the programmer of the apparatus the opportunity to intervene directly in the operation of the GPU 12 to set the thread schedule selection signal 20 and therefore the particular thread schedule configuration which will be used. Alternatively, the thread schedule selection signal 20 may be generated on the basis of a thread schedule selection value (or a function defining how to calculate that value, for example in dependence on a workgroup number or thread number) annotated to an executable binary 24 received by the GPU 12. This executable binary 24 is generated by a compiler 26 on the basis of a source program 28 provided by the programmer. The thread schedule selection value (definition) annotated to the executable binary 24 may have been explicitly selected by the programmer and therefore have formed part of the source program 28, thus providing the system user with another mechanism for dictating which thread schedule configuration should be used. However, the thread schedule value may also be annotated to the executable binary 24 by the compiler 26 on the basis of either its own analysis of the source program 28, on the basis of performance data it receives from the GPU 12, or on the basis of a simulation of the GPU 12. These variants will be discussed individually in more detail below.

Where the GPU 12 provides the compiler 26 with performance data this comes from performance control circuitry 30 which is configured to gather the performance data relating to the activity of the multi-thread execution circuitry 14. This performance data is in particular selected to enable the performance control circuitry 30 to gather information relating to how efficiently the multi-thread execution circuitry 14 is currently operating on the basis of the thread schedule configuration which the thread scheduling circuitry 16 is using to schedule its threads for execution. The performance control circuitry 30 may use a number of different metrics to assess this, but as illustrated, these may comprise an instructions-per-cycle (IPC) count 32, an energy use metric 34 and/or a count of cache misses 36. The energy use metric could for example be the (estimated) energy consumed by the apparatus when performing a predetermined data processing task. The energy consumption could for example be estimated by counting high-energy operations such as floating point add/multiply, instructions fetches and data moves between L1 cache, L2 cache and memory. By assigning a nominal energy cost at each operation it is possible to estimate the total energy used. In addition, the static energy used could be determined by measuring the number of active cycles for each monitored unit and having a nominal energy cost per cycle (equals power) for each unit. Alternatively, explicit circuitry to measure the energy used directly may be provided. The count of cache misses 36 therefore derives its information from the usage by the multi-thread execution circuitry 14 of a cache 38 (which it should be noted may be only one of several caches in a hierarchy) via which the multi-thread execution circuitry 14 accesses data stored in memory 40.

The GPU 12 may be configured to select a thread schedule configuration in a relatively autonomous fashion, and in such embodiments the performance control circuitry 30 is configured to select the appropriate thread schedule configuration on the basis of the performance data which it gathers and to generate the thread schedule selection signal accordingly. This may for example be performed on the basis of an iterative testing procedure such as that which is described below with reference to FIG. 8. In other embodiments the compiler 26 and GPU 12 may cooperate to determine the appropriate thread schedule configuration (such as by a method described below with reference to FIG. 14) and in this situation the performance circuitry 30 is configured to pass the performance data back to the compiler 26.

Figure 2:
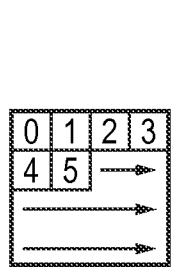
FIG. 2 shows how algorithmic choices made by the programmer can have an effect on cache access efficiency and how the present techniques can address this issue.
Figure 2:
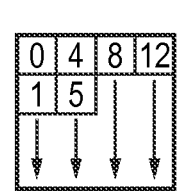
Figure 2:
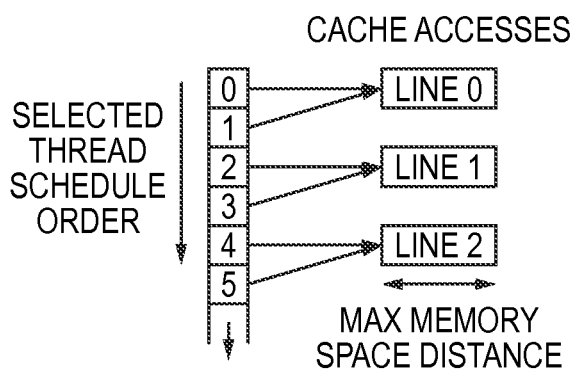
Figure 2:
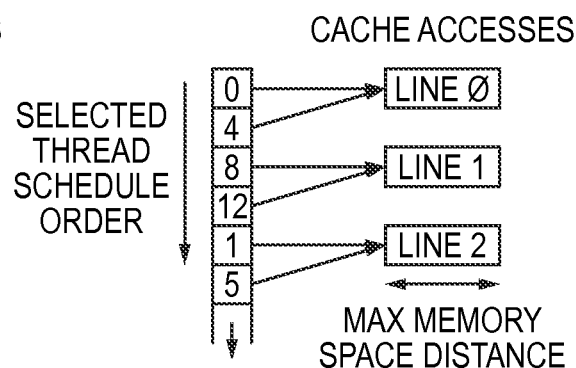

FIG. 2 illustrates a simple example of how the selected thread schedule ordering can benefit system performance, and in particular how the selected thread schedule order can be used to mitigate against source code which has not been optimized for the apparatus on which it is to be executed. Example code A provides a simple pseudo-code example (i.e. from which the principle discussed can be understood by the skilled person, without being constrained by a particular programming language or target apparatus) where sixteen threads (TID=0-15) are generated and a selected target data point in a 2D space is allocated to each for processing. Accordingly, it can be seen that the example code A will result in the allocation of threads to target data items as shown by reference numeral 40. This corresponds to row major ordering in which a sequential ordering of the threads naturally corresponds to a sequential (raster scan) order of the target data items. In the lower part of FIG. 2 the illustration shows how the target data item accessed by each thread uses a local cache, which in this example is configured such that a cache line can hold data corresponding to two target data items. Accordingly, it can be seen in the lower left cache usage example in FIG. 2 that the simple sequential thread schedule order can make efficient usage of this cache, by virtue of the fact that cache line 0 holds target data corresponding to threads 0 and 1, whilst cache line 1 holds target data corresponding to threads 2 and 3, cache line 2 holds target data corresponding to threads 4 and 5 etc. The "maximum memory space distance" shown refers to the cache line size and is discussed in more detail below with reference to FIG. 11B.

FIG. 2 also illustrates the potential for system performance to be significantly affected by only a simple change in the program code. As illustrated in variant B the switching of the two lines of code or the inversion of the variables x and y will result in a column major ordering of the allocation of target data items to threads, as shown by reference numeral 42. Were the apparatus to also use a simple sequential thread schedule order in this situation then the cache usage would be significantly less efficient, because adjacent threads in the schedule order would not correspond to adjacent data items in the target data set. However, as shown lower right in FIG. 2, the apparatus is able to address this issue by selecting a thread schedule order such as that shown (i.e. 0, 4, 8, 12, 1, 5, etc.) such that the efficient cache usage can be regained.

Figure 3:
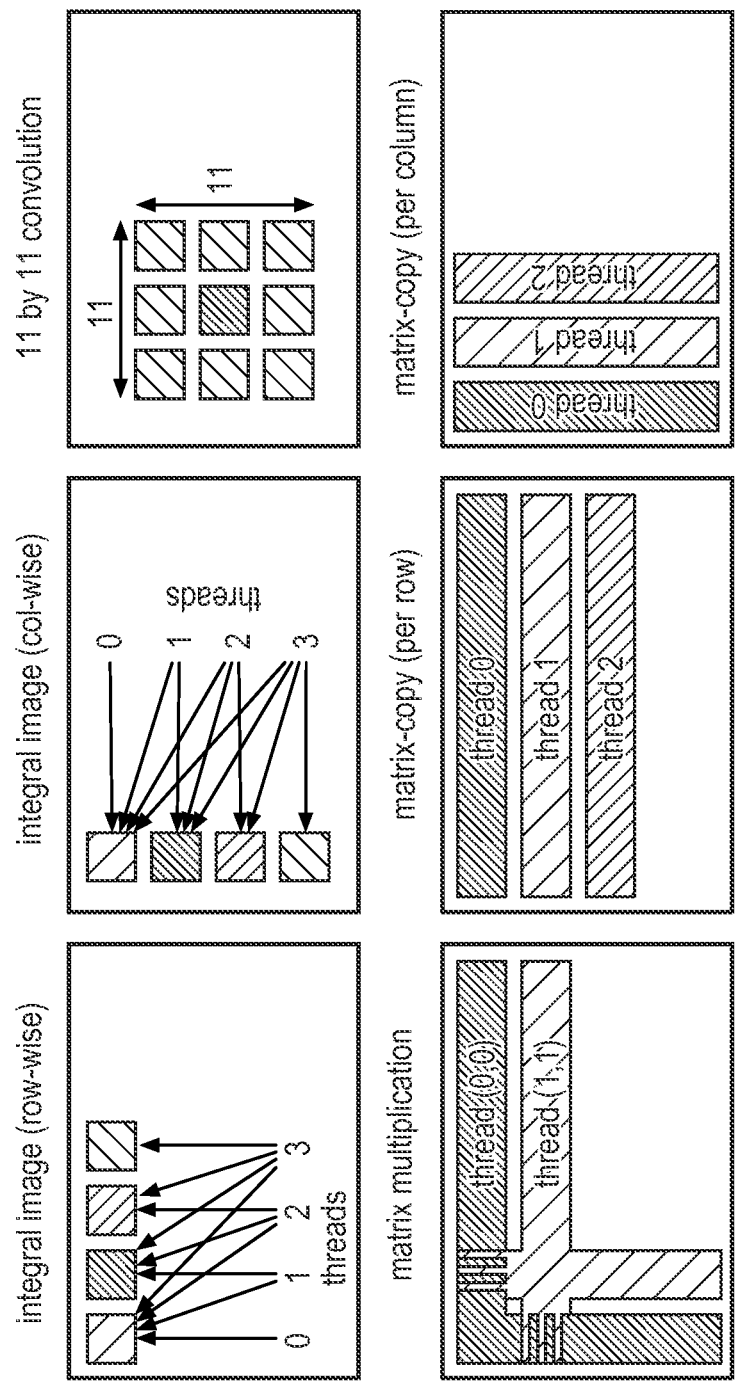
FIG. 3 schematically illustrates six different types of data processing which may be carried out by an apparatus in one embodiment.

It will however be appreciated that the data processing tasks carried out by the individual threads can vary greatly and moreover the target data items which each thread accesses may vary considerably from a simple one-to-one correspondence between threads and target data items. FIG. 3 schematically illustrates six different example types of data processing which may be carried out by the apparatus, and gives an overview of some of the variety of different ways in which individual threads may reference different portions of a target data set. Depending on the relative complexity of the data processing which is to be carried out, the approach taken by the present techniques to determining thread schedule may be more analytical or more empirical as appropriate. For example, for data processing operations such as the matrix-copy operations shown it may be possible for a more analytical approach (for example carried out by the compiler 26 shown in FIG. 1) to be taken, whilst for potentially more complex operations such as the 11×11 convolution shown (or for example computation on unstructured meshes where the data is indirectly accessed through index arrays e.g. A[B[i]]) it may be the case that only an empirical approach to determining the selected thread schedule configuration may be practical.

Figure 4:
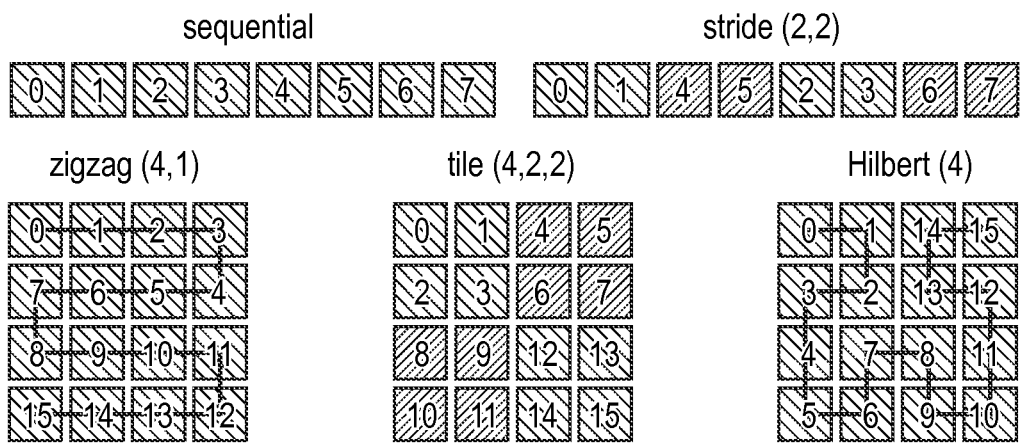
FIG. 4 schematically illustrates five different styles of thread schedule configuration.

FIG. 4 schematically illustrates five different example styles of thread schedule ordering. Furthermore, it can be seen that the styles other than "sequential" each take at least one configuration control parameter which determines how that particular style of thread schedule is implemented. For example, the stride style of thread schedule configuration takes two control parameters, one indicating the stride length (i.e. how many threads are skipped at each iteration) and the other defining a granularity (i.e. how many threads are taken together as a block at each iteration). In the "tile" style of thread schedule configuration, three control parameters are given, the first (4) giving the row length, and the second and third (2, 2) giving the tile dimensions. The thread schedule configuration storage 18 of the GPU 12 shown in FIG. 1 can be configured to store information defining any of these styles of thread schedule configuration, as well as allowing for their particular configuration based on the selection of the control parameters. However, it should be appreciated that the thread schedule configurations which can be stored in thread schedule configuration storage 18 are not limited to those shown in FIG. 4 and any other regular (functionally defined) or even bespoke (e.g. irregular) thread schedule configurations could also be stored.

Figures 5A, 5B:
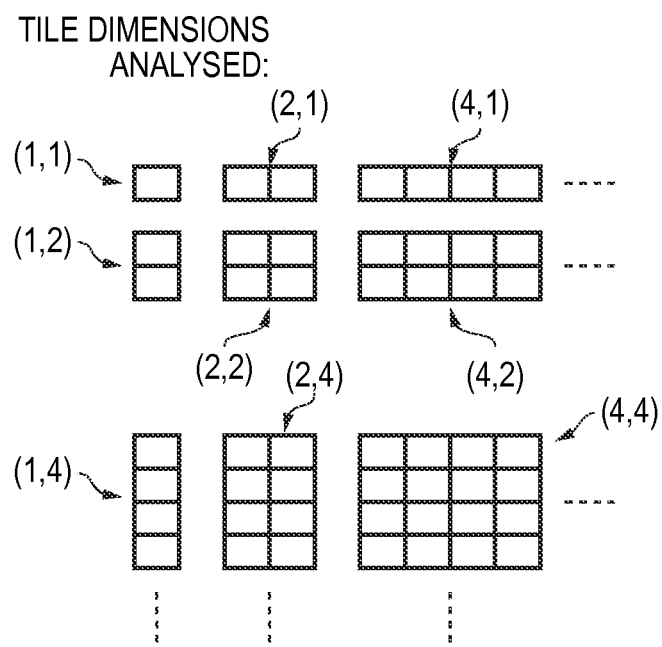
FIG. 5A schematically illustrates some thread schedules configured in a "stride" style using different configuration stride values in one embodiment.
FIG. 5B schematically illustrates different tile sizes for a "tiled" style of thread schedule configuration in one embodiment.

FIG. 5A illustrates different particular configurations of a "stride" style thread schedule configuration, and how the particular thread schedule can be configured in dependence on a control parameter N which sets the stride value as $2^N$. Accordingly, where N=0 a simple sequential thread schedule results, where N=1 the sequence 0, 2, 4 etc. results, where N=2 the sequence 0, 4, 8, 12 etc. results and so on. Note in addition that the example thread schedules shown in FIG. 5A are given in the simplified example where the total number of threads to be scheduled is 16, and the determination of the thread schedule ordering is subject to "modulo 15", such that for example in the sequence given by N=2, thread ID 1 follows thread ID 12 (rather than this being thread ID 16). As part of an analysis procedure (for example an empirical analysis procedure carried out by the data processing apparatus 12 shown in FIG. 1) the use of the control parameter to set a geometric progression of stride values enables the data processing apparatus, when performing an iterative analysis procedure to determine which thread schedule configuration should be used, to more rapidly sweep through a wide range of configurations of this stride style of thread schedule. As part of an iterative process to analyse this particular style of thread schedule configuration, this can therefore allow the appropriate thread schedule configuration to be more rapidly identified.

FIG. 5B illustrates a similar principle being applied to an analysis of a "tile" style of thread schedule configuration where this time two control parameters are varied, these corresponding to the linear dimensions of the selected tile. Each of these is iterated in a geometric fashion like the control parameter N in FIG. 5A, again allowing a range of tile sizes to be quickly and efficiently analysed.

Figure 6A:
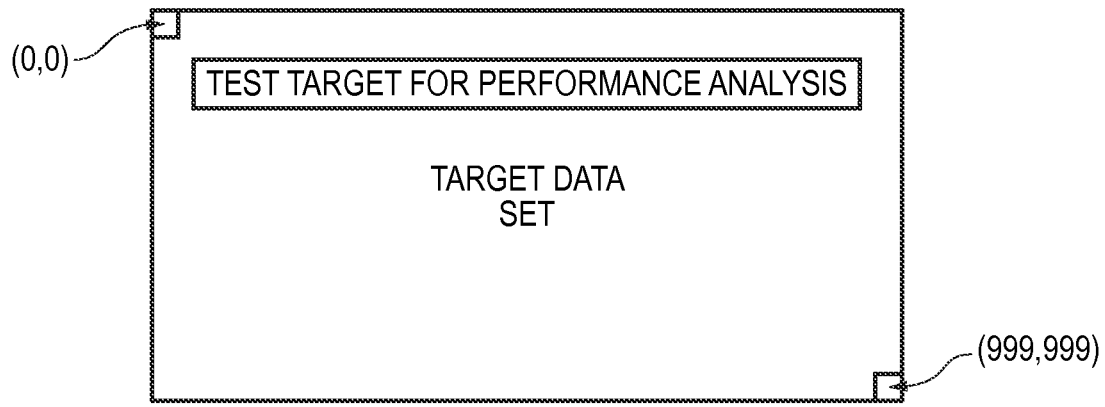
FIG. 6A schematically illustrates a two dimensional target data set in one embodiment.

FIG. 6A schematically illustrates a target data set arranged two dimensionally and having 1000×1000 individual target data items within the set. Also shown in FIG. 6A is a subset of the target data set which has been determined as a test target for performance analysis. Note in particular that this test target is chosen to be at an offset from the beginning of the target data set such that the resulting data processing represents a more "typical" subset of the data processing of the full target data set (avoiding edge effects and so on).

Figure 6B:
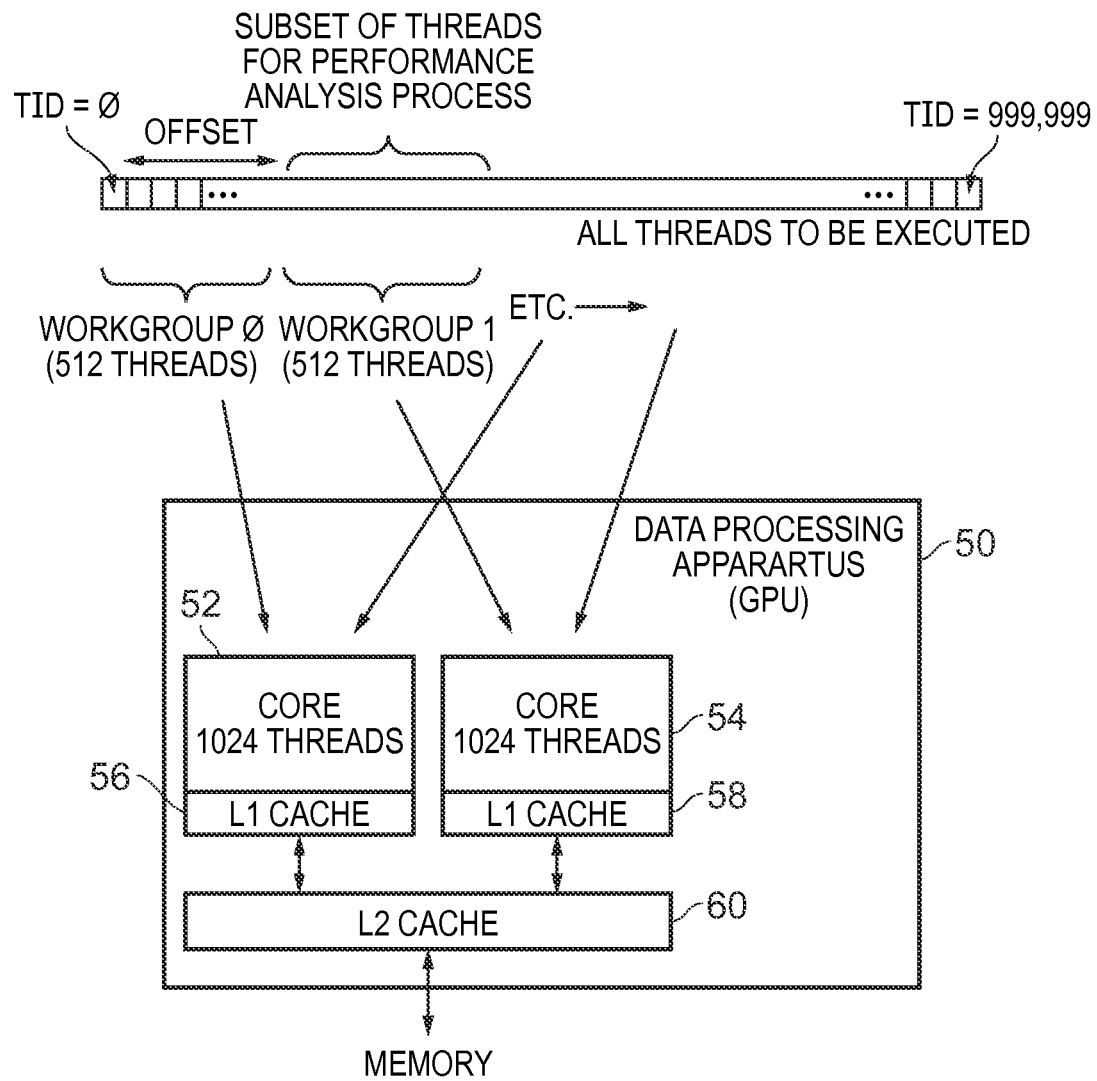
FIG. 6B schematically illustrates a full set of threads to be executed corresponding to the target data set shown in FIG. 6A and how subsets of those threads may be allocated to processor cores for execution.

FIG. 6B schematically illustrates the set of threads which may be generated corresponding to the target data set shown in FIG. 6A. Accordingly, a sequence of one million threads are shown. Also shown is an indication of a subset of the threads which are used for a performance analysis process which begin at an offset from the start (viewed sequentially in terms of thread ID) of the full set of threads.

FIG. 6B also illustrates how groups of threads may be allocated to processor cores for execution in the example where the data processing apparatus is a multicore device. Note that the group of threads is shown as a 1D array for simplicity of illustration, and may indeed be flattened into such a data structure, but could equally be handled as a 2D array corresponding to the target data set. FIG. 6B schematically illustrates a data processing apparatus 50 which comprises two processor cores 52, 54, each of which is configured to be able to execute up to 1024 threads concurrently. Each processor core has its own associated L1 cache 56, 58 respectively and the processor cores 52, 54 share an L2 cache 60. As shown in FIG. 6B, the full set of threads to be executed may have been grouped into a number of "workgroups", each consisting of 512 threads, this allocation being determined by the programmer. These workgroups must then be allocated as a unit to a given processor core for execution, but each processor core can thus handle two workgroups. The manner in which workgroups are allocated to cores represents a further manner in which the selected thread schedule configuration may be implemented.

Figure 6C:
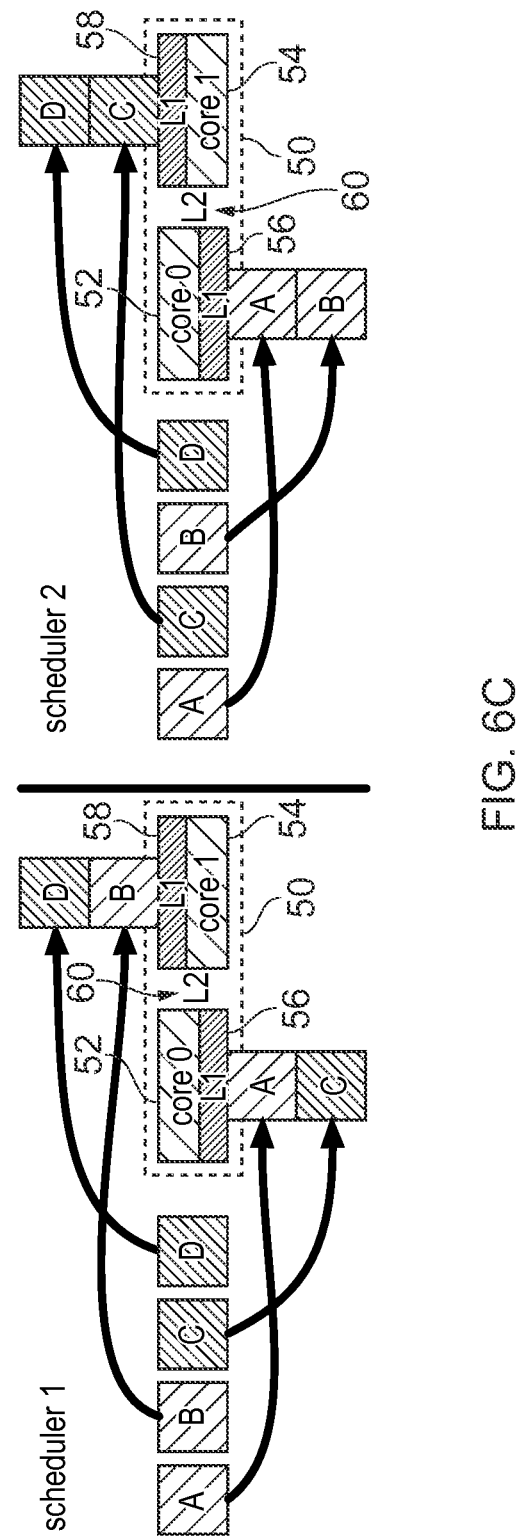
FIG. 6C schematically illustrates two scheduling techniques for allocating four thread blocks onto two parallel multi-threaded processor cores.

FIG. 6C schematically illustrates how 4 workgroups of threads (A-D) may be allocated to the two processor cores 52, 54 of the GPU 50 shown in FIG. 6B. Scheduler 1 shown in FIG. 6C shows the workgroups being allocated to cores in a round-robin fashion, whilst scheduler 2 in FIG. 6C shows subsequent workgroups (in alphabetical, i.e. original, order) being allocated to subsequent cores (though note that the illustrated ordering of the workgroups for scheduler 2 has been switched). The choice of which scheduler to implement (defined by the selected thread schedule configuration) will depend on the nature of the memory accesses performed within each workgroup. Where workgroups with locality are grouped close to each other, the scheduler 1 can benefit from locality in the L2 cache 60 (in space among different cores), whilst the scheduler 2 can benefit from locality in the L1 caches 56 and 58 (in time amongst different workgroups). Note that the shading of the workgroups A-D indicates whether they are assumed to share data (i.e. paired as A & B and C & D respectively).

Figure 7:
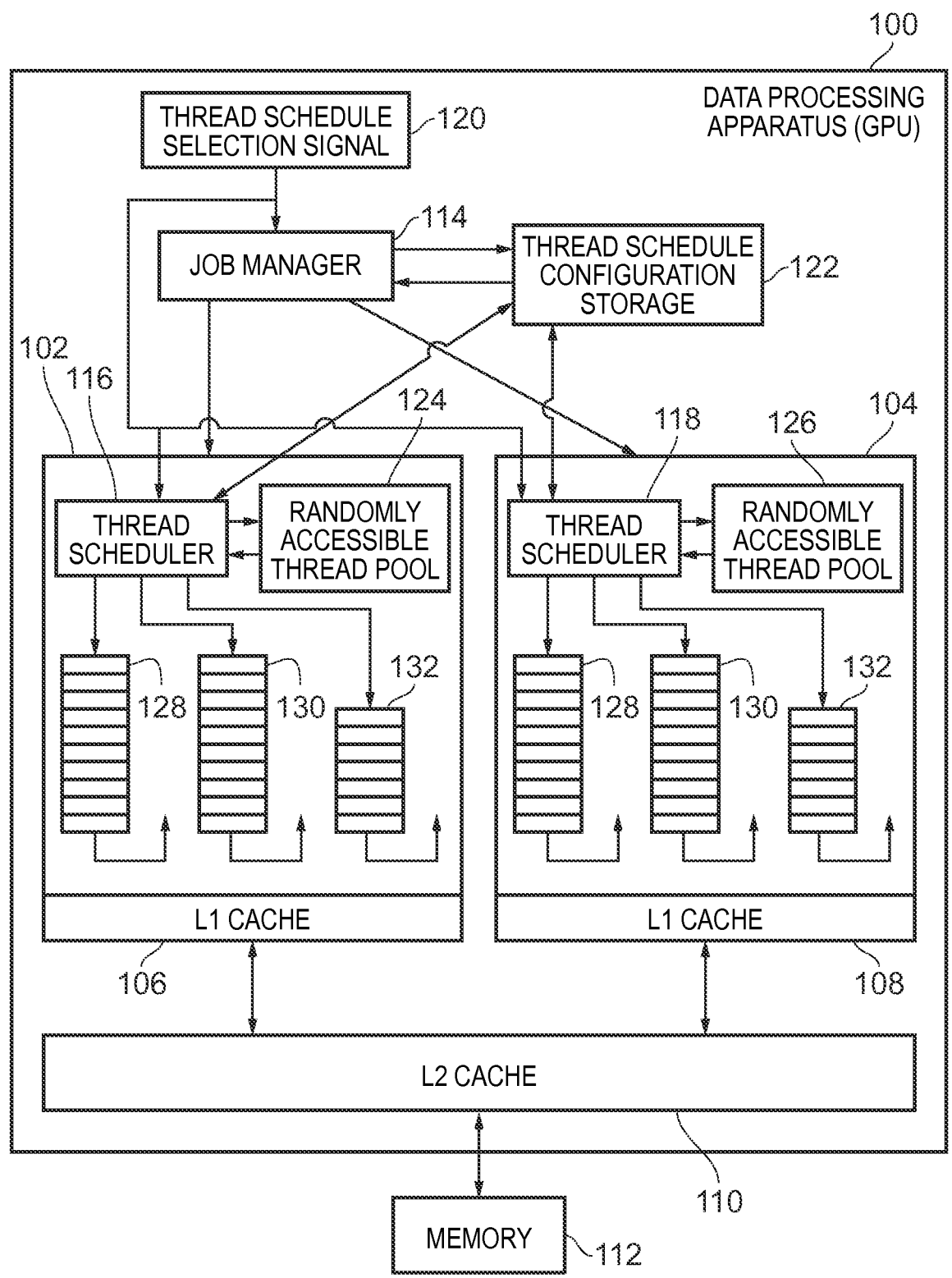
FIG. 7 schematically illustrates an apparatus in one embodiment having two parallel processor cores.

FIG. 7 schematically illustrates an example multi-core GPU 100, which comprises two processor cores 102, 104. Each of these processor cores 102, 104 has its own associated L1 cache 106, 108 and the processor cores 102, 104 share an L2 cache 110 via which accesses to memory 112 are made. In this data processing apparatus, the thread scheduling circuitry described above is provided by the coordination of a job manager 114 and a thread scheduler 116, 118 provided within each processor core 102, 104 respectively. Accordingly, each of the job manager 114, thread scheduler 116 and thread scheduler 118 receives the thread schedule selection signal 120 to configure their operation and in particular to determine which of the thread schedule configurations stored in the thread schedule configuration storage 122 (to which job manager 114, thread scheduler 116 and thread scheduler 118 each have access) to use. Accordingly, a thread schedule configuration can determine how workgroups of threads are allocated by the job manager 114 to the cores 102, 104 (for example as described above with reference to FIG. 6C) but also configures how the individual thread schedulers 116, 118 schedule the threads for execution within each processor core 102, 104 (for example using a particular configuration of one of the thread schedule configuration styles illustrated in FIG. 4). When the job manager 114 allocates a workgroup of threads to one of the processor cores 102, 104, indications of those threads within that workgroup which are now available for immediate scheduling are stored within a randomly accessible thread pool 124, 126 within that processor core. Accordingly, rather than the workgroup of threads allocated to a particular core then being accessed by the thread scheduler in a simple first-come-first-served fashion, the thread schedulers 116, 118 are able to freely pick threads from amongst the population stored in the randomly accessible thread pools 124, 126 for scheduling. The scheduling of threads by the thread schedulers 116, 118 causes particular instructions from the kernel being executed by each thread to be dispatched to one of several different pipelines 128, 130, 132 provided within each processor core. These pipelines 128, 130, 132 may be dedicated to particular types of data processing operation and accordingly (as illustrated) may be of differing lengths. Once an instruction exits its respective pipeline, an indication of this fact is returned to the respective thread scheduler 116, 118 such that it can correctly administer further scheduling of threads and instructions. In view of the above discussion, it should therefore be appreciated that the choice of thread schedule configuration may seek to take advantage of locality effects at different levels of granularity with respect to the allocation of threads to processor cores. This may for example involve arranging that two particular threads will be executed approximately in parallel with one another on the two processor cores 102, 104, for example to benefit from cache locality in the L2 cache 110. It may involve selecting a thread schedule configuration such that two particular threads are scheduled close to one another by a particular thread scheduler on a particular processor core (for example to take advantage of cache locality effects within the L1 caches 106, 108). It may also involve an instruction-level locality where threads are scheduled such that it is expected that individual instructions (for example in parallel pipeline 128 and 130) are expected to benefit from locality effects.

Figure 8:
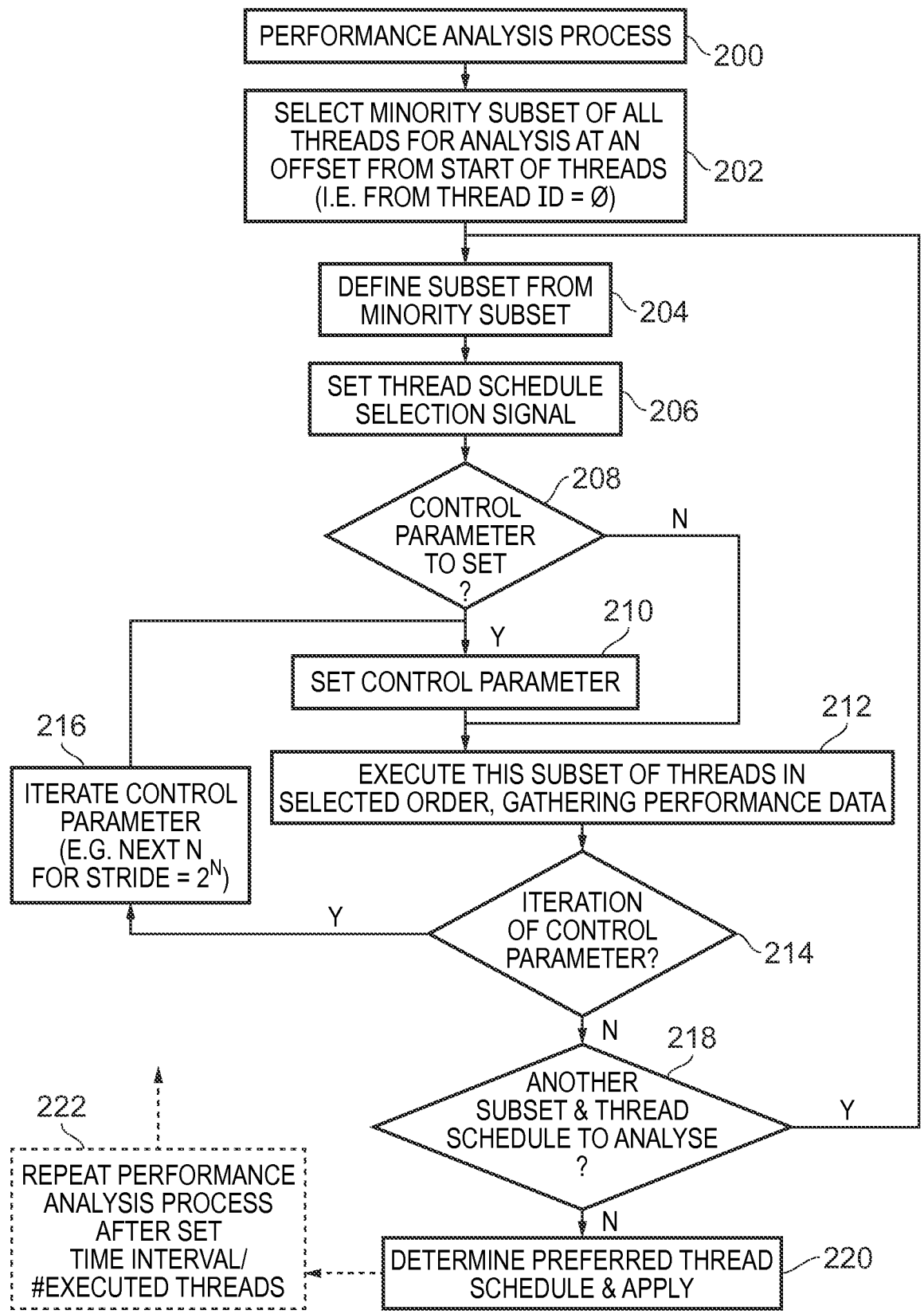
FIG. 8 schematically illustrates a sequence of steps which may be carried out in one embodiment during a performance analysis process.

FIG. 8 schematically illustrates a sequence of steps which may be taken during a method of determining a preferred thread schedule configuration according to an essentially empirical technique. This therefore corresponds to the configuration shown in FIG. 1 where the performance control circuitry 30 is configured to administer this performance analysis process and to generate the thread schedule selection signal both as part of the performance analysis process and thereafter when setting the final selected thread schedule selection signal to be used for the main data processing carried out by the data processing apparatus 12. The performance analysis process begins at step 200. Then, at step 202, a minority subset of all the threads which should be executed (for example to process an entire image frame) are selected for the performance analysis process. This minority subset is selected at an offset from the start of the set of threads as is schematically illustrated in FIG. 6B, such that the test target data set for the performance analysis is offset from the edge of the two-dimensional target data set (image frame) as schematically illustrated in FIG. 6A. It should be noted that it is not always possible to avoid the use of particular portions of the target data set in the simplistic manner illustrated in FIG. 6A, for example where each thread references target data items from a range of positions (or even all positions) across the target data set. Next, at step 204 a first subset is defined from within this minority subset and on which the first iteration of testing should be performed. Then at step 206 the thread schedule selection signal is set to correspond to a thread schedule configuration to be tested at this iteration. At step 208 it is determined if this thread schedule configuration requires an additional control parameter to be set and if it does, then the flow proceeds via step 210 where this control parameter is set to a first value to be tested. The flow then reaches step 212 where this subset of threads is executed in the order determined by the thread schedule configuration selected by the thread schedule selection signal and performance data relating to this execution is gathered. At step 214 if there is a control parameter to be tested and if further iteration of values of this control parameter are to be tested then the flow returns, via step 216, where the next iteration of this control parameters is set, to step 210. The iteration of this control parameter could for example be the setting of the parameter N as described with reference to FIG. 5A for a stride style thread schedule configuration. If there are no control parameters to iterate, or if all iterations of the control parameters have been tested, then from step 214 the flow proceeds to step 218 where it is determined if there is another subset of threads within the minority subset of all threads selected for performance analysis to be tested against a new thread schedule. If there is then the flow returns to step 204 for this subset of threads to be tested using the new thread schedule configuration. Once all of the minority subset of the threads have been executed and accordingly a number of thread schedules have been tested (potentially with a range of control parameters), then at step 220 the preferred thread schedule (and possibly control parameters) are determined on the basis of the performance data gathered at each iteration of step 212. The performance control circuitry 30 then sets the thread schedule selection signal to configure the thread scheduling circuitry 16 to cause the multi-thread execution circuitry 14 to performs its data processing using the selected thread schedule configuration. Optional step 222 in FIG. 8 schematically illustrates that the performance analysis process may be repeated after time intervals or executed number of threads, if it is expected that the performance of the apparatus 12 may vary over that interval. This could for example be the case where the application being executed by the apparatus 12 is expected to change and that a new thread schedule configuration may be more appropriate when the application changes.

Figure 9:
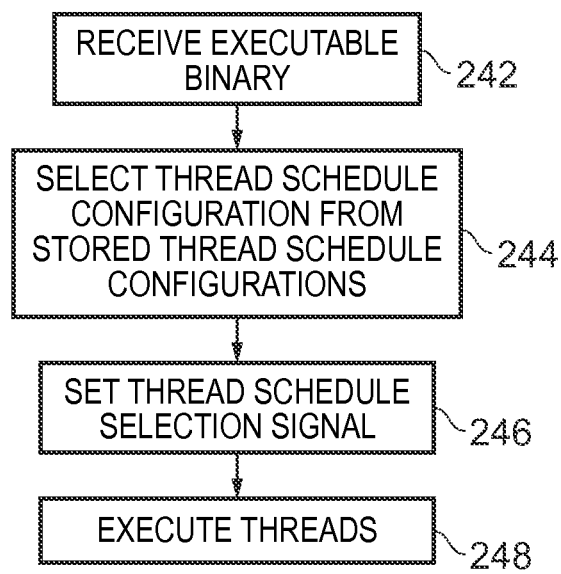
FIG. 9 schematically illustrates a series of steps which may be taken in the method of one embodiment.

FIG. 9 schematically illustrates a high-level view of a method of operating an apparatus such as that shown by GPU 12 in FIG. 1. At step 242 an executable binary (generated by a compiler) is received by the apparatus and at step 244 a thread schedule configuration is selected from a number of stored thread schedule configurations. This selection at step 244 may for example correspond to a performance analysis process such as that described above with reference to FIG. 8. Then at step 246 the thread schedule selection signal is set to cause this thread schedule configuration to be used and at step 248 the threads are executed.

We turn now to consideration in more detail of the compiler 26 shown in FIG. 1, and in particular where this compiler is configured to determine a thread schedule selection value (definition) to annotate to the executable binary 24 which it generates on the basis of the source program 28. In the embodiment schematically illustrated in FIG. 10, the compiler 26 is in particular in a configuration which is suitable when a static analysis of the source program 28 is possible. In order to perform this static analysis, the compiler 26 is provided with an analysis function 300, which is configured to enable the compiler 26 to perform an analysis procedure on the source program 28. The analysis function 300 comprises three main functional stages as illustrated, namely a memory access determination stage 302, a similarity calculation stage 304 and a thread schedule selection and control parameter selection stage 306. The thread schedule selection and control parameter selection stage 306 operates with reference to a thread schedule configuration storage 308 which is essentially identical to the thread schedule configuration storage 18 (in particular having identical content) such that the compiler 26 is able to select a thread schedule configuration which is available to the data processing apparatus 12 and set the thread schedule selection value (definition) (and control parameter where appropriate) corresponding to that thread schedule configuration. As mentioned before, the thread schedule selection value may be an explicit value or may be a function defining how to calculate that value, for example in dependence on a workgroup number or thread number). More detail of the operation of the analysis function 300 is given below with reference to FIGS. 11A, 11B and FIG. 12. Once the thread schedule selection and control parameter selection component 306 of the analysis function 300 has determined a chosen thread schedule configuration, the compiler 26 generates an executable (see component 310) and annotates the appropriate thread schedule selection value (definition) (and control parameter if appropriate) to this executable. The executable is then passed to the data processing apparatus 12 for execution. Whilst the compiler 26 illustrated in FIG. 10 may be configured to perform the analysis procedure in a purely analytic and static fashion, i.e. in which a determination of the selected thread schedule configuration is made without any reference to the performance of the data processing apparatus 12, FIG. 10 also illustrates a variant in which performance data from the performance circuitry 30 in the data processing apparatus 12 is returned to the compiler 26, and in particular to the analysis function 300, such that this performance data may be used to tune the behaviour of the analysis function 300. This configuration variant may therefore been seen as a hybrid configuration in which the analysis procedure performed by the analysis function 300 remains essentially static, but is augmented by a dynamic aspect in the feedback of the performance data from the performance control circuitry 30.

Figure 10:
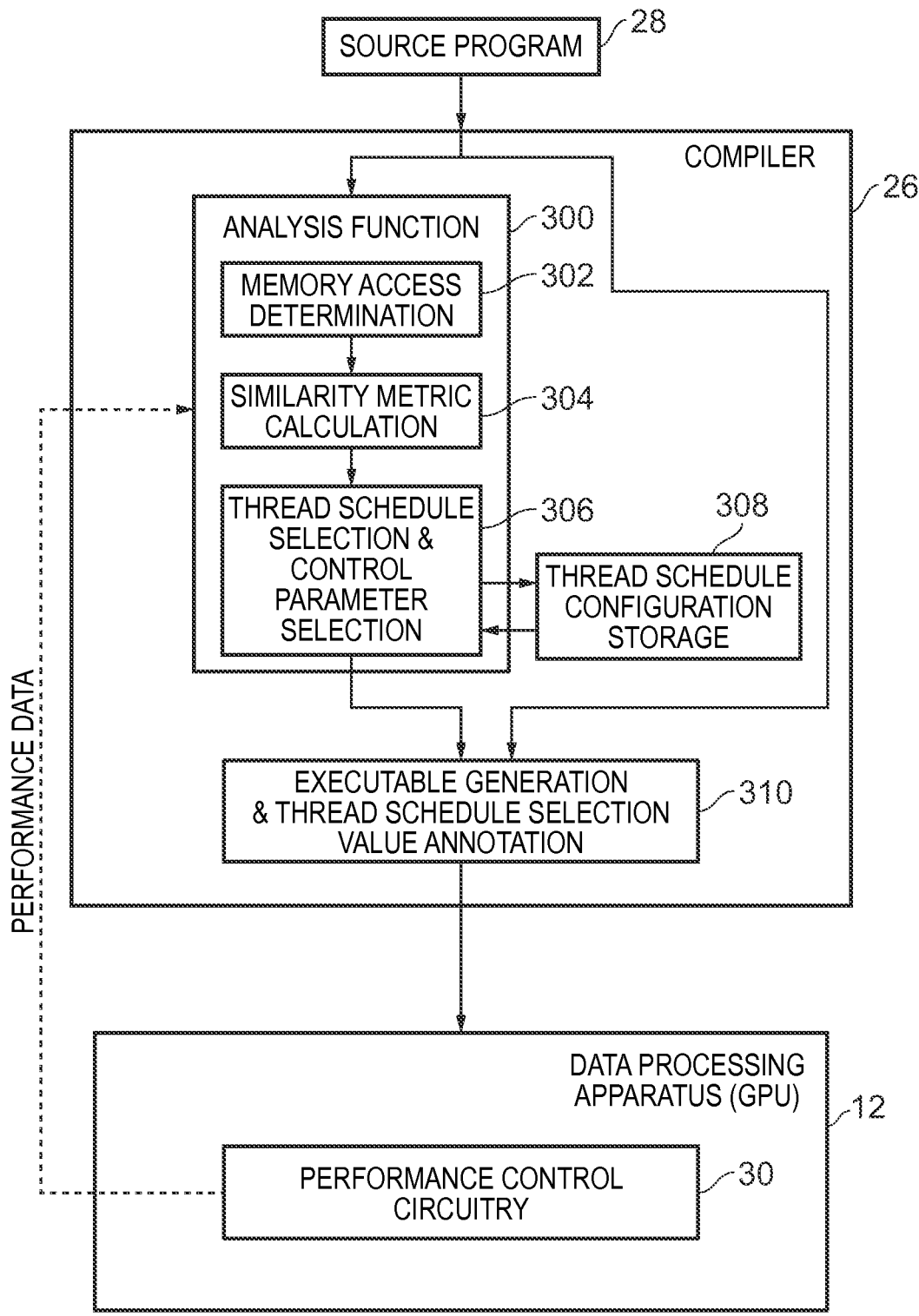
FIG. 10 schematically illustrates in more detail a compiler in one embodiment.
Figure 11A:
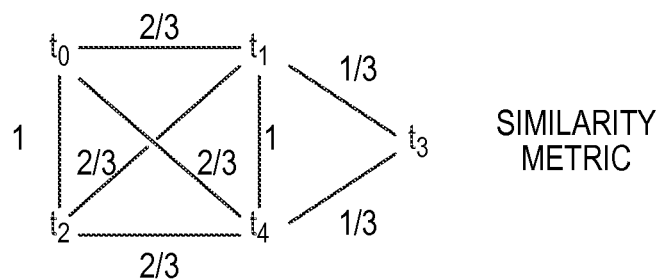
FIG. 11A schematically illustrates the calculation of a similarity metric for a sequence of memory accesses for a number of threads in one embodiment.
Figure 11B:
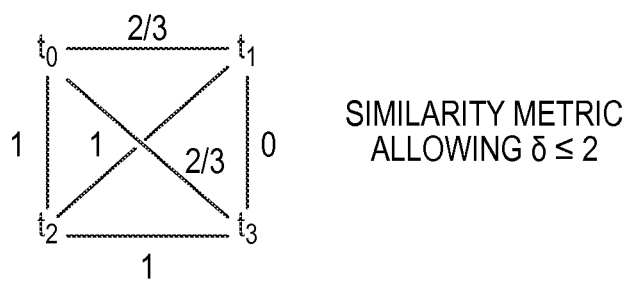
FIG. 11B schematically illustrates the calculation of a similarity metric allowing for a memory space distance between two memory accesses for a sequence of memory accesses for a number of threads in one embodiment.

FIGS. 11A and 11B schematically illustrate the function of the memory access determination stage 302 and the similarity metric calculation stage 304 of the analysis function 300 shown in FIG. 10. The essential function of these two stages of the analysis function 300 is to quantify the memory space locality between threads generated by the source program 28. Firstly, as shown in the upper part of FIG. 11A, the memory access determination function 302 identifies a set of memory accesses which will be made by a number of different threads. Note that the memory accesses are represented by a number which indicates, say, the memory location or cache line number for each access. The progression of memory accesses is from left to right. For simplicity of illustration only a limited set of three memory accesses and five different threads are shown. Next, the similarity metric calculation function 304 determines a value of the similarity metric on the basis of the memory access patterns found, which in the example of the memory accesses shown in the upper part of FIG. 11A may be represented by a similarity graph such as that shown in the lower part of FIG. 11A. The figure given on each edge of the similarity graph represents the degree of matching for the memory accesses of the two threads which that edge joins together. This degree of similarity is parameterised as a value between zero (no matching) and one (full matching). Accordingly, for example, it can seen that a value of 1 is annotated on the edge connecting threads $t_0$ and $t_2$, since all three memory accesses match, whilst a value of a third is annotated to the edge connecting the threads $t_1$ and $t_3$ because only one memory access (to location 7) matches.

It is however not necessary for the memory locations of the respective memory accesses of two threads to identically match for there to be a performance benefit which may be derived from ordering those two threads close to one another in the schedule. This is due to the fact that the performance benefit may be gained if the two memory accesses are for example shared within a single cache line. Refer again to the discussion of the lower part of FIG. 2. Accordingly, FIG. 11B illustrates an example of the calculation of the similarity metric in which a difference $\delta$ between the two memory access locations is allowed for those memory accesses to still be determined to "match". In the example illustrated in FIG. 11B, the maximum memory space distance $\delta$ is set to 2 meaning that the memory accesses shown in the upper part of FIG. 11B can differ by up to 2 and still be determined to "match". This maximum memory space distance $\delta$ can be set in dependence on the particular configuration of the part of the memory hierarchy for which the analysis procedure is seeking to improve the performance, for example in dependence on the line size of a cache, whose performance is sought to be improved. The resulting similarity metric for the memory accesses shown in the upper part of 11B is illustrated by the similarity graph shown in lower part of FIG. 11B. Determining a thread schedule configuration on the basis of the calculated similarity metric may then for example be performed by determining a path through a similarity graph such as those illustrated in the lower parts of FIGS. 11A and 11B which maximises the similarity. For example, in the example of FIG. 11A this ordering could be $t_0$-$t_2$-$t_1$-$t_4$-$t_3$. In the example of FIG. 11B, this ordering could be $t_1$-$t_0$-$t_2$-$t_3$. The memory space distance may instead (or in addition) be used to parameterise the degree to which the thread ordering can be allowed to deviate and for the matching to still be found. This is because threads do not execute in lock-step, but might diverge a little. For example, the second instruction of thread 1 might in fact be executed at (more or less) the same time as the first instruction of thread 0. Therefore, similarity is also important not only at the same instruction but also at mismatching (but close) instructions.

Figure 12:
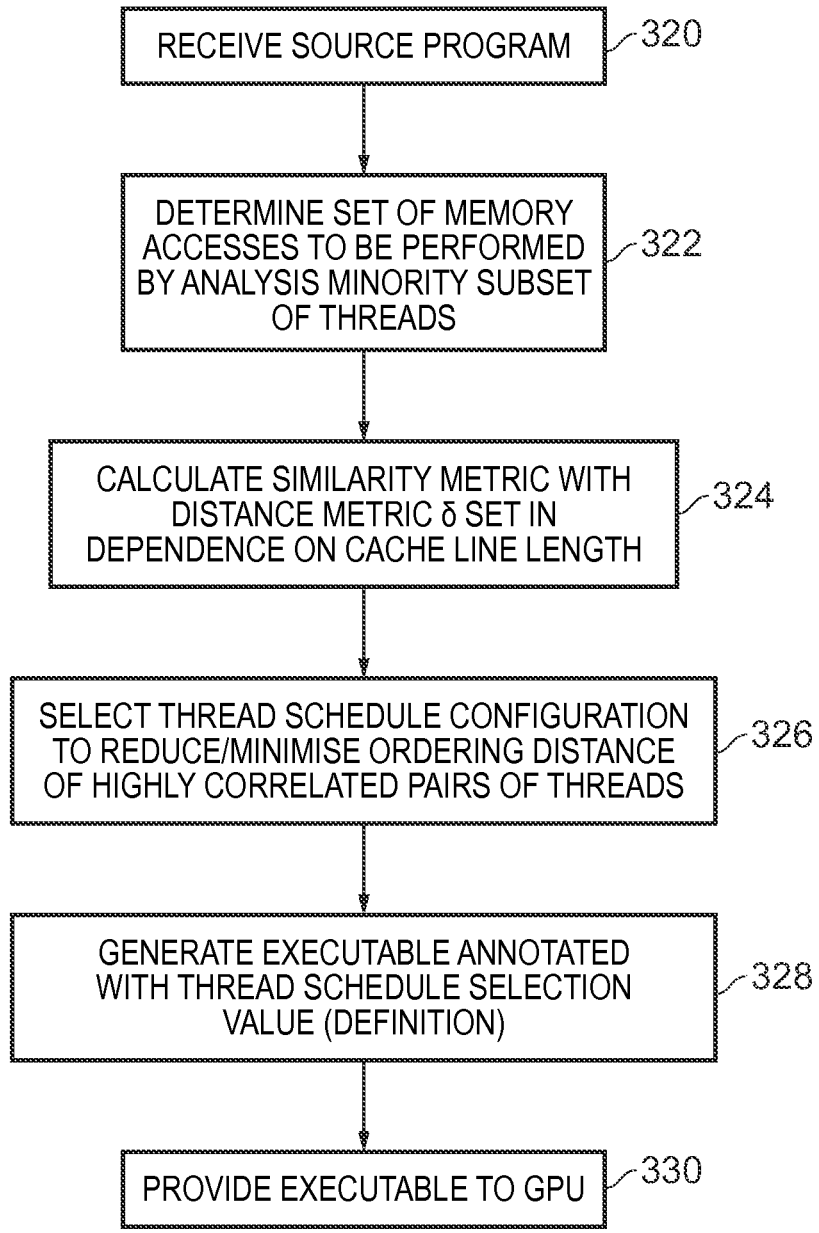
FIG. 12 schematically illustrates a series of steps which may be taken by a compiler in one embodiment.

FIG. 12 schematically illustrates a sequence of steps which may be taken by a compiler 26 configured such as is illustrated in the embodiment shown in FIG. 10. At step 320 the compiler receives the source program and, using this as an input, at step 322 the set of memory accesses to be performed by an "analysis minority subset" of all the threads defined by the source program is determined. Accordingly, it should be appreciated that the analysis function 300 of the compiler 26 is configured to select only a minority subset of all the threads defined by the source program 28 as the basis on which the analysis procedure will be performed. Selecting a minority subset in this manner is important because it is recognised that the number of similarities which must be determined is quadratic with the number of threads. Furthermore, the determination of the path through a similarity graph is known to be NP (non-deterministic polynomial-time) hard. Accordingly, a careful limit on the size of the subset of the threads on which the analysis procedure is carried out must be made, in order to enable the required calculations to be practicable. Alternatively or in addition (but not explicitly shown) it would be possible to reduce the computation required by limiting the number of permutations (e.g. strided or tiled) and compute the (average) similarities between adjacently scheduled threads for those permutations.

Next at step 324 the similarity metric is calculated with a distance metric $\delta$ set in dependence on the cache line length of a cache whose performance the analysis procedure is seeking to improve. Then at step 326 a thread schedule configuration is selected to minimise (or at least reduce) the ordering distance between highly correlated pairs of threads. It should be noted that whilst a full minimization between the ordering distance of highly correlated pairs of threads may in practice be prohibitively expensive in terms of the computational power/time required, an improved thread schedule configuration may nevertheless be chosen which can be identified to reduce the order of distance between highly correlated pairs of threads. For example, pairs of threads which are recognised to be entirely uncorrelated can explicitly be separated and at least a portion of the pairs of threads which are determined to be highly correlated can be brought to a close ordering distance (e.g. adjacent) with respect to one another. Thus, even though a full fully optimized thread schedule configuration may not have been determined, and an improvement in system performance may nevertheless be achieved. Thereafter, at step 328 the compiler generates an executable on the basis of the source program 28 annotated with the selected thread schedule selection value (definition) (and control parameter as appropriate) and at step 330, this executable is provided to the GPU 12.

Figure 13:
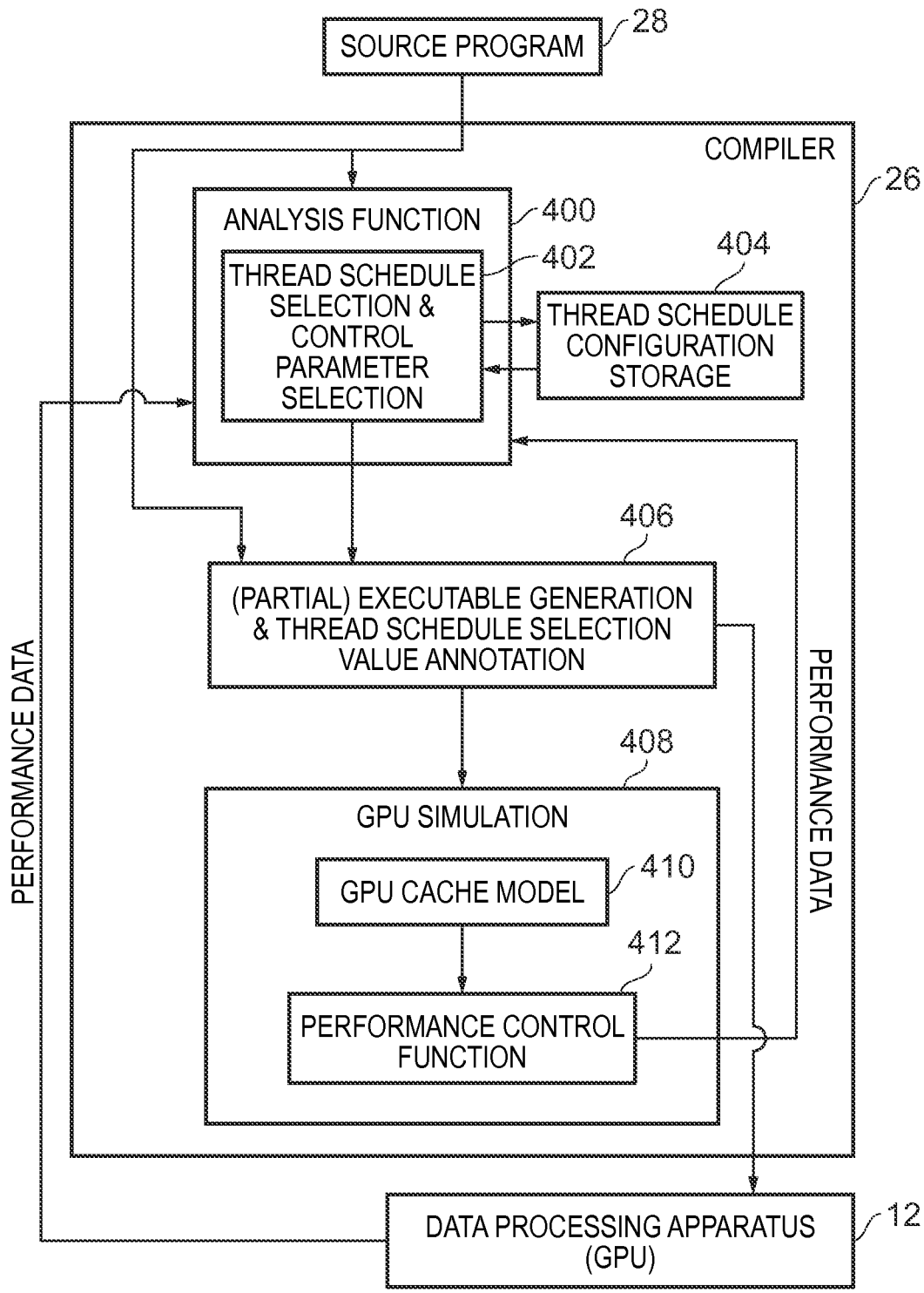
FIG. 13 schematically illustrates in more detail a compiler in one embodiment.

FIG. 13 schematically illustrates in more detail the compiler 26 when it is configured to determine the appropriate thread schedule configuration in a more dynamic or empirical fashion. In this configuration the analysis procedure to determine a selected thread schedule configuration is not performed based on an analysis of the source program 28, but rather by performing an iterative testing process in which a number of thread schedule configurations are tested. Accordingly, in this configuration, the analysis function 400 selects a first thread schedule selection value (definition) (and control parameter where appropriate), causes this thread schedule configuration to be tested and receives performance data related to the execution of threads in accordance with that thread schedule configuration. It then continues through an iterative process of changing the thread schedule selection value (definition) (and control parameter as appropriate) to receive performance data for a number of different thread schedule configurations. The thread schedule selection and control parameter selection component 402 of the analysis function 400 (like component 306 shown in FIG. 10) has access to a thread schedule configuration storage 404, which (like component 308 in FIG. 10) matches the thread schedule configuration storage 18 in GPU 12. Two possibilities are illustrated in FIG. 13 for the manner in which the compiler 26 may test a particular thread schedule configuration. On the one hand the compiler 26 can at each iteration of the testing procedure generate a new executable and annotate the thread schedule selection value (definition) for that iteration to the executable and pass this to the data processing apparatus 12 for execution. In this configuration the performance control circuitry 30 of the GPU 12 then returns the performance data to the analysis function 400. On the other hand, the compiler 26 illustrated in FIG. 13 is provided with a simulation of the GPU 408, to which it can pass an executable annotated with a thread schedule selection value (definition) for testing. A performance control function 412 within this GPU simulation 408 can then return performance data to the analysis function 400 to enable the analysis function 400 to determine the preferred thread schedule configuration. It should be noted that the GPU simulation 408 is schematically illustrated in FIG. 13 as forming part of the compiler 26, but this is not strictly necessary and it may be the case that the compiler 26 merely has access to a separately provided GPU simulation. Furthermore, note that as illustrated in FIG. 13, it may in fact be a partial executable which is generated by component 406 to be passed to the GPU simulation 408. This is in particular because the GPU simulation 408 may not be a full simulation of the GPU 12, but rather may only be a simulation of one or more parts of the GPU, the performance of which the compiler 26 is seeking to improve. For example, as in the example of FIG. 13, the GPU simulation 408 may comprise a GPU cache model 410 and accordingly, the executable generated on the basis of the source program 28 for testing on this partial GPU simulation may only need to represent those parts of the source program which are relevant to the GPU cache usage. The GPU cache model 410 then provides the performance control function 412 with its own performance data which in turn are then returned to the analysis function 400.

Figure 14:
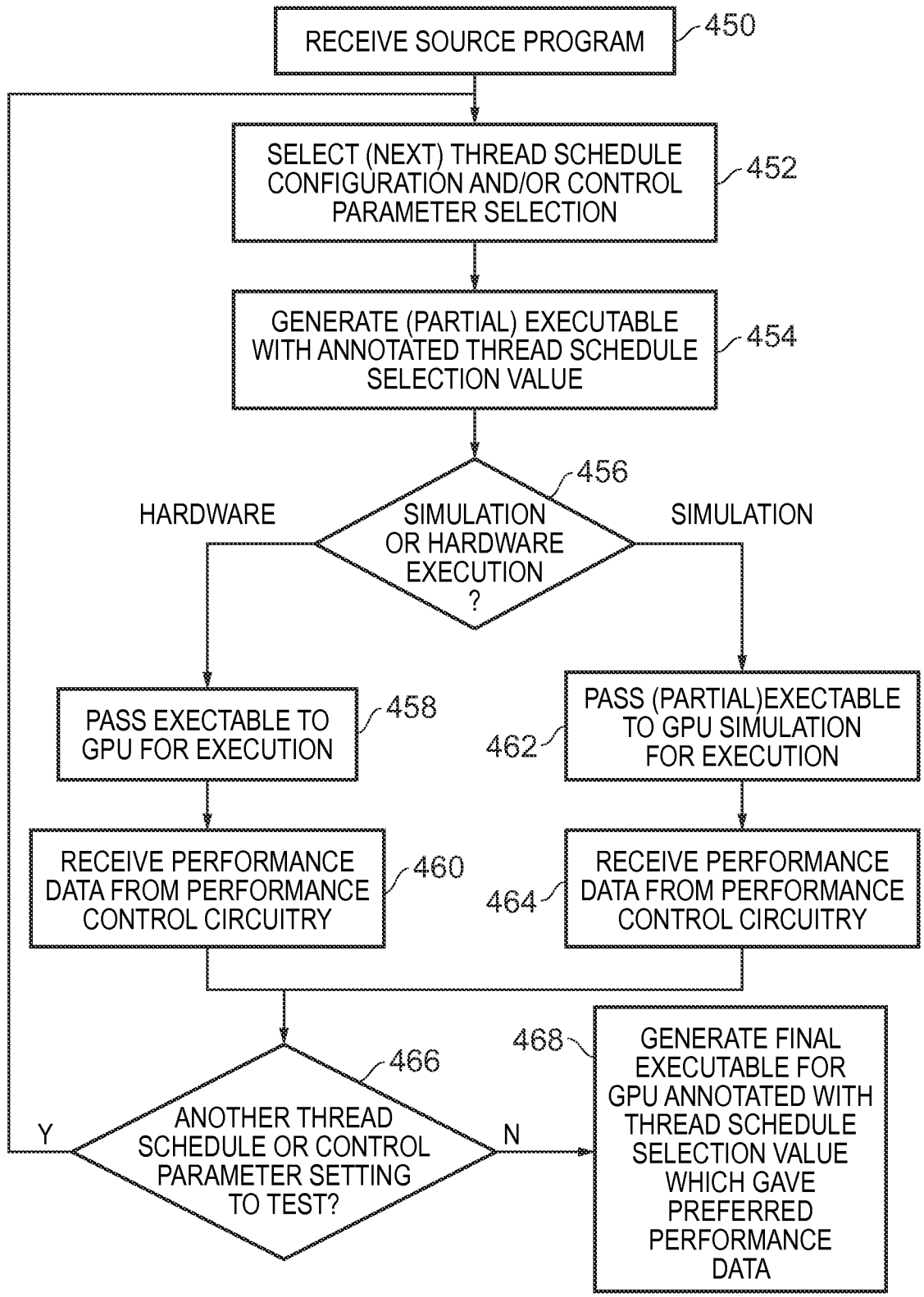
FIG. 14 schematically illustrates a sequence of steps which may be taken by a compiler in one embodiment.

FIG. 14 schematically illustrates a sequence of steps which may be taken by a compiler 26 such as that illustrated in the example of FIG. 13 when carrying out an analysis procedure using the source program 28 as an input, either to gather performance data from the GPU 12 itself or from a simulation thereof. The flow begins at step 450 where the compiler 26 receives the source program 28 and at step 452 the analysis function 400 of the compiler 26 begins the iterative process by the thread schedule selection and control parameter selection component 402 selecting a thread schedule configuration (and control parameter as appropriate) for this iteration of testing. Next, at step 454 an executable is generated annotated with the appropriate thread schedule selection value (definition) (and control parameter as appropriate) and at step 456 the flow diverges in dependence on whether this executable is to be tested on the hardware (i.e. the GPU 12) or on a simulation. For the hardware testing the flow proceeds to step 458 where the executable is passed to the GPU 12 for execution and at step 460 the analysis function 400 receives performance data from the performance control circuitry 30 of the GPU 12. Alternatively, if the executable is to be tested on the GPU simulation 408 then from step 456 the flow proceeds to step 462 where the executable is passed to the GPU simulation 408 for execution. Note that, as explained above, when proceeding via the simulation path it may be the case that it is in fact only a partial executable which is generated and tested. Then at step 464 the analysis function 400 receives performance data from the performance control function 412 of the GPU simulation 408. Whether the hardware or simulation path is followed at step 466 it is then determined by the analysis function 400 if there is another thread schedule or control parameter setting to test. If there is then the flow returns to step 452 for the next thread schedule configuration or control parameter selection to be tested. Once all thread schedule configurations and control parameters have been tested then at step 468 the compiler generates the final executable for the GPU 12 annotated with the thread schedule selection value (definition) (and control parameter selection value as appropriate) which gave the preferred performance data.

Figure 15:
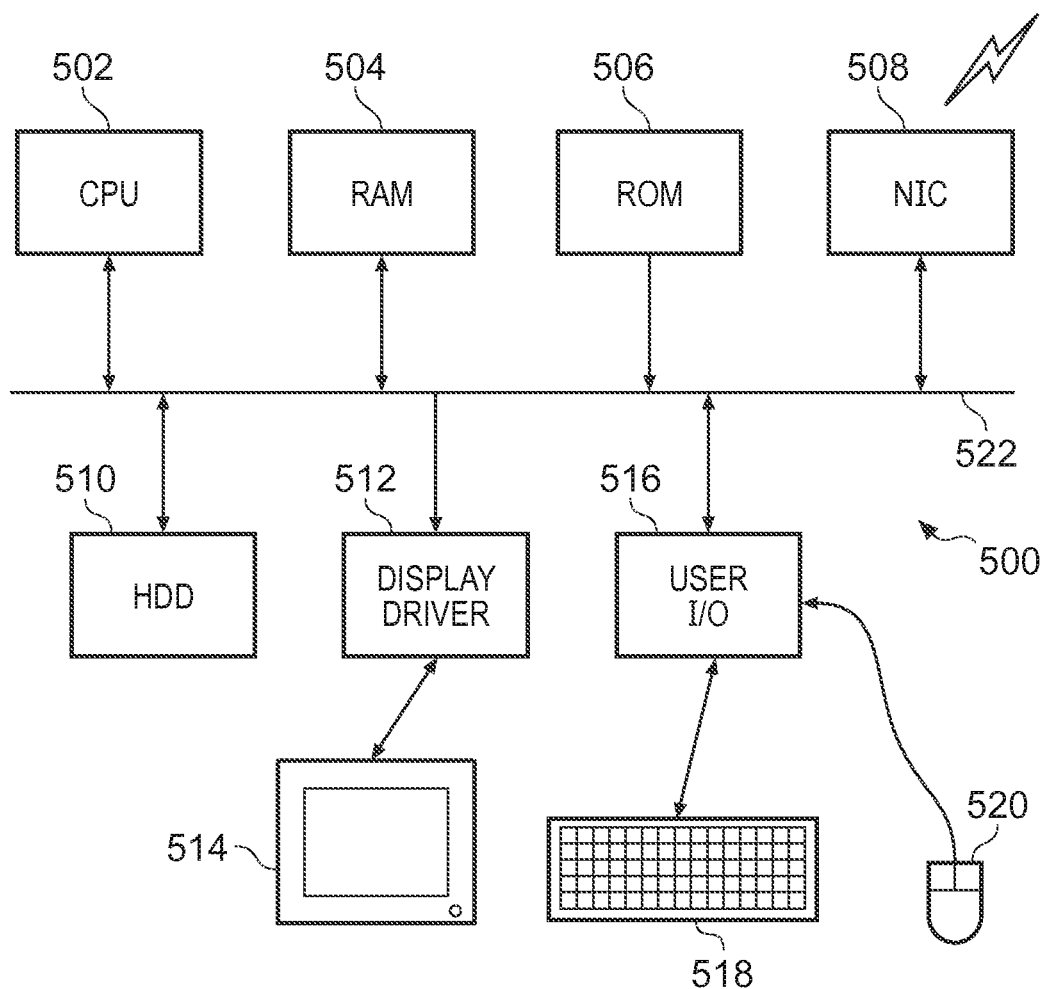
FIG. 15 schematically generates a general purpose computing device on which the present techniques may be carried out in some embodiments.

FIG. 15 schematically illustrates a general purpose computing device 500 of the type that may be used to implement some of the above described techniques. The general purpose computing device 500 includes a central processing unit 502, a random access memory 504 and a read only memory 506, connected together via bus 522. It also further comprises a network interface card 508, a hard disk drive 510, a display driver 512 and monitor 514 and a user input/output circuit 516 with a keyboard 518 and mouse 520 all connected via the common bus 522. In operation, such as when providing the functionality of at least one of the compilers described above, the central processing unit 502 will execute computer program instructions that may for example be stored in the random access memory 504 and/or the read only memory 506. Program instructions could be additionally retrieved from the hard disk drive 510 or dynamically downloaded via the network interface card 508. The results of the processing performed may be displayed to a user via a connected display driver 512 and monitor 514. User inputs for controlling the operation of the general purpose computing device 500 may be received via a connected user input output circuit 516 from the keyboard 518 or the mouse 520. It will be appreciated that the computer program could be written in a variety of different computer languages. The computer program may be stored locally on a recording medium or dynamically downloaded to the general purpose computing device 500. When operating under control of an appropriate computer program, the general purpose computing device 500 can perform the above described compiler-related techniques and can be considered to form a compiler for performing the corresponding above described techniques. Note that a GPU for which the compiler is generating an executable would typically also be connected to the bus 522, but this is not shown here since only example features of a device providing the compiler itself are shown. The architecture of the general purpose computing device 500 could vary considerably and FIG. 15 is only one example.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The work leading to this invention has received funding from the European Union Seventh Framework Programme [FP7/2007-2013] under grant agreement n° 287767.14

Various further examples of the present techniques are set out in the following numbered clauses:

1. Apparatus for performing data processing in a single program multiple data fashion on a target data set, the apparatus comprising:

execution circuitry configured to execute multiple threads to perform the data processing;

thread schedule configuration storage configured to store information defining a plurality of thread schedule configurations, each thread schedule configuration defining an order in which the multiple threads are to be executed by the execution circuitry; and thread scheduling circuitry configured to cause the execution circuitry to execute the multiple threads in a selected order defined by a selected thread schedule configuration of the plurality of thread schedule configurations in response to a thread schedule selection signal.

2. The apparatus of clause 1, wherein the execution circuitry comprises multiple processor cores, the thread scheduling circuitry comprises job manager circuitry, and the selected thread schedule configuration further defines the allocation of threads to cores by the job manager circuitry.

3. The apparatus of any preceding clause, wherein the thread scheduling circuitry further comprises randomly accessible thread pool storage configured to store an indication of threads which are immediately available for execution by the execution circuitry.

4. A method of compiling a source program which defines data processing to be performed on an apparatus in a single program multiple data fashion on a target data set, wherein the apparatus comprises:

execution circuitry configured to execute multiple threads to perform the data processing;

thread schedule configuration storage configured to store information defining a plurality of thread schedule configurations, each thread schedule configuration defining an order in which the multiple threads are to be executed by the execution circuitry; and thread scheduling circuitry configured to cause the execution circuitry to execute the multiple threads in a selected order defined by a selected thread schedule configuration of the plurality of thread schedule configurations in response to a thread schedule selection value, the method comprising the steps of:

selecting the selected thread schedule configuration in dependence on analysis information derived from an analysis procedure carried out using the source program as an input; and generating an executable program for the apparatus on the basis of the source program, wherein the executable program is annotated with a definition of the thread schedule selection value corresponding to the selected thread schedule configuration selected in the selecting step.

5. The method of clause 4, wherein the analysis procedure comprises the steps of:

analysing the source program to determine a set of memory accesses which will be performed by a set of threads of the multiple threads;

calculating a similarity metric which quantifies correlations between memory accesses for each pair of threads in the set of threads; and selecting the selected thread schedule configuration such that the selected order causes pairs of threads for which the similarity metric indicates a high correlation to be executed with a close ordering distance to one another in the selected order.

6. The method of clause 5, wherein the set of threads is a minority subset of the multiple threads.

7. The method of clause 6, wherein the minority subset of the threads is selected to start at a predetermined offset from a beginning of all the multiple threads.

8. The method of any of clauses 4-7, wherein the similarity metric quantifies correlations between plural pairs of memory accesses for each pair of threads.

9. The method of any of clauses 4-8, wherein the similarity metric is configured in dependence on a distance metric which determines a maximum memory space distance between two memory accesses for which the two memory accesses can be determined by the similarity metric to have a non-zero correlation.

10. The method of clause 9, wherein the maximum memory space distance is given by a cache line size in the data processing apparatus.

11. The method of clause 9, wherein the maximum memory space distance is given by an ordering distance between two threads to which the two memory accesses belong.

12. The method of any of clauses 5-11, wherein at least some of the plurality of thread schedule configurations are further configured in dependence on a control parameter.

13. The method of clause 12, wherein the plurality of values of the control parameter corresponds to a geometric progression of the control parameter.

14. The method of clause 13, wherein the geometric progression is powers of two of the control parameter.

15. The method of any of clauses 12-14, wherein the control parameter is a stride value, the stride value determining a number of threads which are skipped to find a next thread in the selected order, the next thread in the selected order being determined subject to a modulo of a total number of the multiple threads.

16. The method of any of clauses 12-14, wherein the control parameter is at least one tiling dimension value, the tiling dimension value determining a dimension of tiles within a two-dimensional coordinate space of the target data set, and wherein the selected order causes the execution circuitry to execute the multiple threads on a tile-by-tile basis.

17. The method of clause 4, wherein the analysis procedure comprises:

test generating a test executable program for the data processing apparatus on the basis of the source program, wherein the test executable program is annotated with a test thread schedule selection value definition corresponding to a test thread schedule configuration;

causing the test executable program to be executed on the apparatus, wherein the apparatus further comprises performance control circuitry configured to gather performance data relating to the data processing performed by the execution circuitry;

receiving the performance data from the apparatus;

repeating the test generating, causing and receiving steps, wherein the test executable program is annotated with a new test thread schedule selection value definition corresponding to a new test thread schedule configuration for each repetition, and in the generating step the thread schedule selection signal is generated in dependence on the performance data.

18. The method of clause 4, wherein the analysis procedure comprises:

test generating an at least partial test executable program on the basis of the source program, wherein the at least partial test executable program is annotated with a test thread schedule selection value definition corresponding to a test thread schedule configuration;

causing the at least partial test executable program to be executed on an at least partial simulation of the apparatus, wherein the at least partial simulation of the apparatus further comprises a performance control function configured to gather performance data relating to the data processing performed by the at least partial simulation of the apparatus;

receiving the performance data from the at least partial simulation of the apparatus;

repeating the test generating, causing and receiving steps, wherein the test executable program is annotated with a new test thread schedule selection value definition corresponding to a new test thread schedule configuration for each repetition, and in the generating step the thread schedule selection signal is generated in dependence on the performance data.

19. The method of clause 18, wherein the at least partial simulation of the apparatus comprises a model of a cache within the apparatus.

20. A computer readable storage medium storing in a non-transient fashion a computer program configured to cause a computer to carry out the method of any of clauses 4-19.

21. Apparatus for performing data processing in a single program multiple data fashion on a target data set substantially as described herein with reference to the accompanying figures.

22. A method of performing data processing in a single program multiple data fashion on a target data set substantially as described herein with reference to the accompanying figures.

23. A method of compiling a source program which defines data processing to be performed on an apparatus in a single program multiple data fashion on a target data set substantially as described herein with reference to the accompanying figures.

The invention claimed is:

1. Apparatus for performing data processing in a single program multiple data fashion on a target data set, the apparatus comprising:
   at least one graphics processor configured to execute multiple threads to perform the data processing, wherein the target data set comprises an image frame comprising a plurality of pixels, the threads corresponding to respective pixels within the image frame, the at least one graphics processor is capable of processing a maximum number of threads in parallel, and when a number of threads to be processed is greater than the maximum number, the at least one graphics processor is configured to process said number of threads in a plurality of iterations for processing successive groups of threads; and
   a digital data storage configured to store information defining a plurality of pixel-processing thread schedule configurations, each pixel-processing thread schedule configuration defining an order in which the pixels of the image frame are mapped to the successive groups of threads to be processed in said plurality of iterations by the at least one processor, wherein a first pixel-processing thread schedule configuration and a second pixel-processing thread schedule configuration of the plurality of pixel-processing thread schedule configurations each comprise a respectively different order in which the pixels of the image frame are to be mapped to said successive groups of threads,
   wherein the at least one graphics processor is further configured to, in response to pixel-processing a thread schedule selection signal, (a) select a pixel-processing thread schedule configuration of the plurality of pixel-processing thread schedule configurations, and (b) execute the multiple threads corresponding to the pixels of the image frame in a selected time-based ordering of the multiple threads as defined by the selected pixel-processing thread schedule configuration, and
   wherein the at least one graphics processor is further configured to gather performance data relating to the performed data processing in relation to each pixel-processing thread schedule of the plurality of pixel-processing thread schedule configurations and to generate the pixel-processing thread schedule selection signal in dependence on the gathered performance data.

2. The apparatus as claimed in claim 1, wherein the at least one graphics processor is further configured to control a performance analysis process, the performance analysis process comprising:
   selecting a minority subset of the multiple threads which are to be executed;
   executing a first subset of the minority subset of the multiple threads in a first selected order defined by a first pixel-processing thread schedule configuration;
   changing the thread schedule selection signal to cause a next subset of the minority subset of the multiple threads to be executed in a next selected order defined by a next pixel-processing thread schedule configuration; and
   repeating the changing step until all threads of the minority subset of threads have been executed,
   wherein the thread selection signal is set to cause the at least one graphics processor to execute a majority remaining subset of the multiple threads which are to be executed to perform the data processing on the target data set in an order defined by a selected thread schedule tested in the performance analysis process.

3. The apparatus as claimed in claim 2, wherein the first subset and next subset each correspond to a workgroup of threads, wherein a workgroup of threads is a selected subset of the multiple threads defined by a programmer of the apparatus or set by default.

4. The apparatus as claimed in claim 2, wherein at least some of the plurality of pixel-processing thread schedule configurations are further configured in dependence on a control parameter and the performance analysis process further comprises gathering performance data relating to the data processing performed for a plurality of values of the control parameter.

5. The apparatus as claimed in claim 4, wherein the plurality of values of the control parameter corresponds to a geometric progression of the control parameter.

6. The apparatus as claimed in claim 5, wherein the geometric progression is powers of two of the control parameter.

7. The apparatus as claimed in claim 4, wherein the control parameter is a stride value, the stride value determining a number of threads which are skipped to find a next thread in the selected order, the next thread in the selected order being determined subject to a modulo of a total number of the multiple threads.

8. The apparatus as claimed in claim 4, wherein the control parameter is at least one tiling dimension value, the tiling dimension value determining a dimension of tiles within an at least two-dimensional coordinate space of the threads, and wherein the selected order causes the at least one graphics processor to execute the multiple threads on a tile-by-tile basis.

9. The apparatus as claimed in claim 2, wherein the at least one graphics processor is configured to repeat the performance analysis process at predetermined intervals.

10. The apparatus as claimed in claim 2, wherein the at least one graphics processor is configured to select the minority subset of the threads to start at a predetermined offset from a beginning of all the multiple threads.

11. The apparatus as claimed in claim 1, wherein the at least one graphics processor is configured to measure a performance versus time taken metric for the data processing as the performance data.

12. The apparatus as claimed in claim 1, wherein the at least one graphics processor is further configured to measure an energy use metric for the data processing as the performance data.

13. The apparatus as claimed in claim 1, wherein the at least one graphics processor comprises at least one event counter configured to count occurrences of a predetermined event during the data processing as the performance data.

14. The apparatus as claimed in claim 13, wherein the predetermined event is a cache miss in a cache which forms part of the apparatus.

15. The apparatus as claimed in claim 14, wherein the at least one graphics processor comprises multiple processor cores and the cache is shared by the multiple processor cores.

16. The apparatus as claimed in claim 1, further configured to receive the thread schedule selection signal from an external source.

17. The apparatus as claimed in claim 16, wherein the apparatus is configured to receive a set of instructions defining the data processing to be performed in the single program multiple data fashion on the target data set, wherein the thread schedule selection signal is generated by the apparatus in dependence on a thread schedule selection value definition associated with the set of instructions.

18. A method of performing data processing in a single program multiple data fashion on a target data set, the method comprising the steps of:
executing multiple threads to perform the data processing using at least one graphics processor, wherein the target data set comprises an image frame comprising a plurality of pixels, the threads corresponding to respective pixels within the image frame, the at least one graphics processor is capable of processing a maximum number of threads in parallel, and when a number of threads to be processed is greater than the maximum number, the at least one graphics processor is configured to process said number of threads in a plurality of iterations for processing successive groups of threads; and
storing information defining a plurality of pixel-processing thread schedule configurations, each pixel-processing thread schedule configuration defining an order in which the pixels of the image frame are mapped to the successive groups of threads to be processed in said plurality of iterations in the executing step, wherein a first pixel-processing thread schedule configuration and a second pixel-processing thread schedule configuration of the plurality of pixel-processing thread schedule configurations each comprise a respectively different order in which the pixels of the image frame are to be mapped to said successive groups of threads;
in response to a thread schedule selection signal, (a) selecting a pixel-processing thread schedule configuration of the plurality of pixel-processing thread schedule configurations, and (b) controlling the execution of the multiple threads corresponding to the pixels of the image frame in a selected time-based ordering of the multiple threads as defined by the selected pixel processing thread schedule configuration; and
gathering performance data relating to the data processing in relation to each pixel-processing thread schedule configuration of the plurality of pixel-processing thread schedule configurations performed by executing and selecting the thread schedule in dependence on the gathered performance data.

19. Apparatus for performing data processing in a single program multiple data fashion on a target data set comprising:
means for executing multiple threads to perform the data processing, wherein the target data set comprises an image frame comprising a plurality of pixels, the threads corresponding to respective pixels within the image frame, the means for executing is capable of processing a maximum number of threads in parallel, and when a number of threads to be processed is greater than the maximum number, the means for executing is configured to process said number of threads in a plurality of iterations for processing successive groups of threads; and
means for storing information defining a plurality of pixel-processing thread schedule configurations, each pixel-processing thread schedule configuration defining an order in which the pixels of the image frame are mapped to the successive groups of threads to be processed in said plurality of iterations by the means for executing multiple threads, wherein a first pixel-processing thread schedule configuration and a second pixel-processing thread schedule configuration of the plurality of pixel-processing thread schedule configurations each comprise a respectively different order in which the pixels of the image frame are to be mapped to said successive groups of threads;
means for, in response to a pixel-processing thread schedule selection signal, (a) selecting a pixel-processing thread schedule configuration of the plurality of pixel-processing thread schedule configurations, and (b) controlling the execution of the multiple threads corresponding to the pixels of the image frame in a selected time-based ordering of the multiple threads as defined by the selected pixel-processing thread schedule configuration; and
means for gathering performance data relating to the data processing performed by the means for executing multiple threads in relation to each pixel-processing thread schedule configuration of the plurality of pixel-processing thread schedule configurations and for generating the pixel-processing thread schedule selection signal in dependence on the gathered performance data.

* * * * *